(12) United States Patent
Lehner

(10) Patent No.: US 7,003,859 B2
(45) Date of Patent: Feb. 28, 2006

(54) DOOR HINGE REPAIR APPARATUS AND METHOD

(76) Inventor: Ronald F. Lehner, 877 Bavaria Hills Ter., Chaska, MN (US) 55318

( * ) Notice: Subject to any disclaimer, the term of this patent is extended or adjusted under 35 U.S.C. 154(b) by 0 days.

(21) Appl. No.: 11/064,371

(22) Filed: Feb. 23, 2005

(65) Prior Publication Data

US 2005/0138773 A1 Jun. 30, 2005

Related U.S. Application Data

(63) Continuation of application No. 10/858,783, filed on Jun. 2, 2004.

(60) Provisional application No. 60/475,886, filed on Jun. 4, 2003, provisional application No. 60/475,860, filed on Jun. 4, 2003.

(51) Int. Cl.
*B23P 6/00* (2006.01)

(52) U.S. Cl. ............... 29/402.03; 29/402.08; 29/402.01

(58) Field of Classification Search ............ 29/402.03, 29/402.08, 402.14, 402.15, 525.11, 270, 271, 29/11, 255; 16/386, 340
See application file for complete search history.

(56) References Cited

U.S. PATENT DOCUMENTS

| | | | |
|---|---|---|---|
| 3,334,405 A * | 8/1967 | Cann et al. | 29/257 |
| 5,570,498 A | 11/1996 | Hipkiss et al. | |
| 5,590,441 A | 1/1997 | Spencer | |
| 5,682,646 A | 11/1997 | Tyler, IV et al. | |
| 5,761,769 A | 6/1998 | Brückner et al. | |
| 5,867,498 A | 2/1999 | Klüting | |
| 5,987,703 A | 11/1999 | Klüting et al. | |
| 6,178,599 B1 | 1/2001 | Worden et al. | |
| 6,591,451 B1 | 7/2003 | Gruber et al. | |
| 6,820,361 B1 | 11/2004 | Popikow | |
| 2003/0182761 A1 | 10/2003 | Kidd | |

FOREIGN PATENT DOCUMENTS

| | | |
|---|---|---|
| CA | 2 101 981 | 10/1996 |
| CA | 2 348 323 | 11/2002 |
| CA | 2 354 796 | 2/2003 |

OTHER PUBLICATIONS

Kit information and photos, Car-Pak Manufacturing, 1401 Axtell Dr., Troy, MI 48084, 248-435-7221 [Products received after Jun. 4, 2003; date actually available, unknown] (3 pgs total).

(Continued)

*Primary Examiner*—John C. Hong
(74) *Attorney, Agent, or Firm*—Mueting, Raasch, & Gebhardt, P.A.

(57) ABSTRACT

Apparatus for use in repairing, and methods of repairing, a door hinge of a vehicle includes use of a substitute hinge bracket and at least one pin configured to be received through at least one opening of a vehicle frame bracket. A locking portion of the at least one pin and a locking surface that defines an opening in the hinge bracket are configured such that the at least one pin is locked in a fixed position relative to the hinge bracket when assembled. Further, another repair apparatus includes a substitute pin having an interference portion for forming an interference fit with one or more surfaces defining an opening of a factory hinge bracket.

10 Claims, 14 Drawing Sheets

OTHER PUBLICATIONS

Kit information and photos, Disco Automotive Hardware, 6 Mile So. Hwy 177, P.O. Box 858, Sulphur, OK 73086 [Products received after Jun. 4, 2003; date actually available, unknown] (4 pgs total).

Kit information and photos, R & B Inc., 3400 East Walnut Street, Colmar, PA 18915 [Products received after Jun. 4, 2003; date actually available, unknown] (2 pgs total).

Kit information and photos, Ken-Co Industries Ltd., Ontario, Canada [Product available prior to Jun. 4, 2003] (4 pgs total).

"Replacement Door Pin and Bushing Package" product sheet [online]. Ken-Co Industries Ltd., Ontario, Canada [website accessed on Jan. 14, 2004] (product available prior to Jun. 4, 2003). Retrieved from the Internet: <URL:http://www.ken-co.com/hingepin/default.htm>; 2 pgs.

"Replacement Door Pin and Bushing Package, Dodge Full Size Trucks —1994 to 2003" product sheet [online]. Ken-Co Industries Ltd., Ontario, Canada [website accessed on Jan. 14, 2004]. Retrieved from the Internet: <URL:http://www.ken-co.com/hingepin-dodge.htm>; 2 pgs.

* cited by examiner

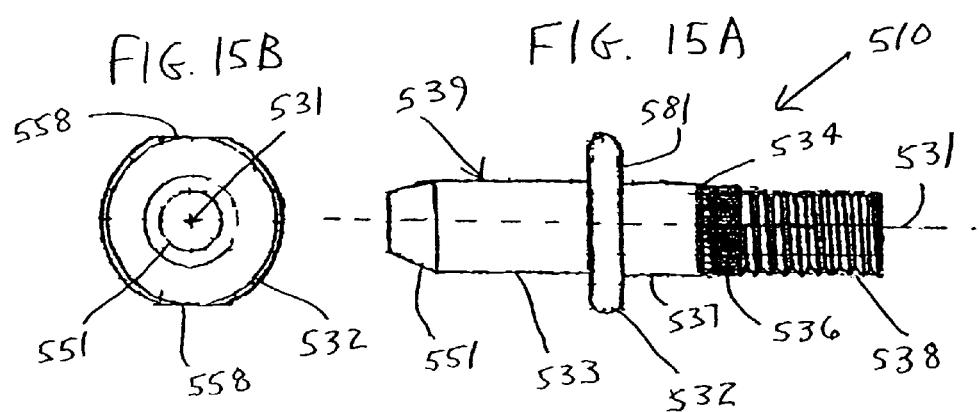
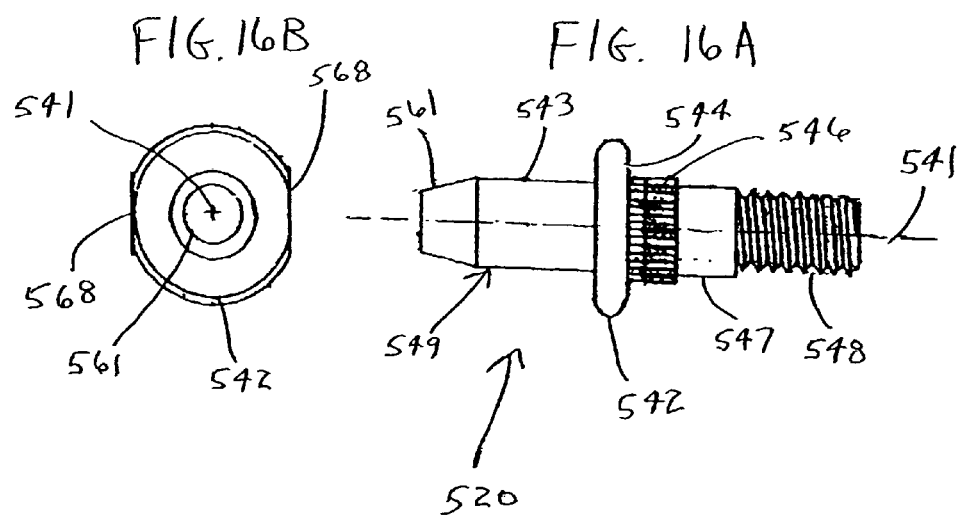

DOOR HINGE REPAIR APPARATUS AND METHOD

CROSS-REFERENCE TO RELATED APPLICATIONS

This is a continuation of U.S. patent application Ser. No. 10/858,783, filed 2 Jun. 2004, (pending), which claims the benefit of U.S. Provisional Application No. 60/475,886, filed 4 Jun. 2003, and U.S. Provisional Application No. 60/475,860, filed 4 Jun. 2003, which are all incorporated herein by reference.

BACKGROUND OF THE INVENTION

The present invention relates generally to door hinges (e.g., vehicle door hinges). At least in one embodiment, for example, the present invention relates to the repair of vehicle door hinges.

There are numerous types of door hinges used on various types of vehicles. For example, one type of conventional factory door hinge assembly 10 (e.g., for a driver's side of a vehicle) is shown in the prior art diagrams of FIGS. 1–2. For example, such a door hinge is used on 1999 and various newer vehicles such as a Cadillac Escalade, a Cadillac Escalade EXT, a Chevrolet Avalanche, a Chevrolet Silverado pick-up, a Chevrolet Suburban, a Chevrolet Tahoe, a GMC Denali, a GMC Sierra pick-up, a GMC Suburban, and a GMC Yukon.

As shown in FIG. 1A, the factory hinge assembly 10 for the vehicle 9 includes a factory frame bracket 18 attached to the vehicle frame (e.g., welded), a factory door bracket 16 attached (e.g., welded) to a driver's side door 14, and a factory hinge bracket assembly 20 for coupling the factory vehicle frame bracket 18 to the factory door bracket 16 to mount the driver's side door 14 relative to the vehicle frame 12. The factory hinge bracket assembly 20 includes a factory hinge bracket 22 coupled to the vehicle frame bracket 18 using an upper factory pin 24 and a lower factory pin 26.

The factory vehicle frame bracket 18, as shown separately in FIG. 1C, generally includes a body portion 40 for attachment to the vehicle frame 12 along with spaced apart extension members 42, 44 extending from the body portion 40. An upper opening 46 is defined in the upper extension member 42 and a lower opening 48 is generally defined in lower extension member 44. The upper opening 46 and lower opening 48 are typically orthogonal to a factory frame bracket axis 50 along which such openings 46, 48 lie.

The factory hinge bracket assembly 20 generally includes a factory hinge bracket 22. As shown in FIG. 2, the factory hinge bracket 22 includes a body portion 59 having two spaced apart extension members 52, 54 extending therefrom. The extension members 52, 54 are generally configured such that the factory hinge bracket 22 fits within a space defined by the extension members 42, 44 of factory vehicle frame bracket 18.

Although not shown in FIG. 2, factory hinge bracket 22 further includes openings defined in each of extension members 52, 54. When the factory hinge bracket 22 and the vehicle frame bracket 18 are assembled, the openings defined in each of extensions members 52, 54 and the openings 46, 48 defined in extension members 42, 44 of the vehicle frame bracket 18 are generally aligned along axis 50 of the vehicle frame bracket 18 and lie orthogonal to the axis 50.

The factory hinge bracket 22 is coupled to the frame bracket 18 using the upper factory pin 24 and lower factory pin 26. As best shown in FIG. 2, the upper factory pin 24 is inserted through the upper opening 46 defined in extension member 42 of the factory vehicle frame bracket 18 and also through the opening (not shown) in extension member 52 of factory hinge bracket 22. Prior to insertion of the upper factory pin 24, a bushing (not shown) is also inserted into opening 46 of the factory vehicle frame bracket 18. A peened end 25 of the upper factory pin 24, along with engagement element 23 of upper factory pin 24, provide for coupling of the extension member 52 of the hinge bracket 22 to the upper extension member 42 of the factory vehicle frame bracket 18, and further provide a pin end portion 29 over which factory door bracket 16 may be placed.

Likewise, after insertion of a bushing (not shown) within lower opening 48 of lower extension member 44 of factory vehicle frame bracket 18, lower factory pin 26 is inserted through the opening defined in the lower extension member 54 of the factory hinge bracket 22 and through lower opening 48 in lower extension member 44 of the vehicle frame bracket 18. Peened end 27 of lower factory pin 26, as well as engagement element 31 of lower factory pin 26, hold a lower factory pin 26 in position for coupling the factory hinge bracket 22 to the factory vehicle frame bracket 18, and further provide a pin end portion 37 over which the factory door bracket 16 may be placed.

The factory door bracket 16, as shown in FIG. 1B, typically includes a bracket body portion 28 with spaced apart extension members 30, 32 extending from body portion 28. Generally, the body portion 28 is attached to the door 14 of the vehicle 9, such as, for example, by welding.

An upper opening 34 is defined in extension member 30 and a lower opening 36 is defined in extension member 32. Generally, the upper opening 34 and the lower opening 36 are spaced a distance apart along factory door bracket axis 41. Generally, such upper and lower openings 34, 36 lie orthogonal to axis 41.

With the door bracket 16 attached to the door 14, the door 14 may be hung via the upper and lower openings 34, 36 on pin end portions 29, 37 of the factory hinge bracket assembly 20. After the door 14 is positioned relative to the vehicle frame 12 via the factory hinge 10, the door 14 may further be adjusted.

For example, as shown in FIG. 1B, a factory adjustment slot 43 may be provided in a tab of the factory door bracket 16, and a bolt opening 49 may be provided in the body portion 50 of the factory hinge bracket 22. A bolt or any other fastening or coupling mechanism 51, as shown in FIG. 1A, may be used to adjust the factory door bracket 16 vertically with respect to factory hinge bracket 22 by insertion of the bolt 51 through the bolt opening 49 in the hinge bracket 22 and through factory adjustment slot 43 of factory door bracket 16. With the door in an adjusted position, the bolt (or any other suitable hardware) may be used to lock the factory door bracket 16 into a position relative to the factory hinge bracket 22.

In many circumstances, the factory door bracket 16 is welded to door 14 and the vehicle frame bracket 18 is welded to the vehicle frame 12. As such, if a factory hinge 10 becomes defective, a standard method of repair would include removing the defective hinge assembly 10 and welding on new components. Further, the new components would have to be painted, as typically they are not coated from the factory. In some circumstances, both hinges of the door may need to be repaired. Such a removal and replacement process is very costly, both in terms of the parts needed to complete the repair, as well as labor costs.

SUMMARY OF THE INVENTION

The present invention provides apparatus and methods which reduce the cost associated with defective vehicle door hinge removal and replacement, such as repair of a door hinge described above in the Background of the Invention.

An apparatus for use in repairing a door hinge of a vehicle according to the present invention is described herein. The door hinge includes at least a vehicle frame bracket attached to a portion of a vehicle frame of the vehicle. The vehicle frame bracket includes at least one opening defined therein.

The apparatus for use in the repair includes at least one pin configured to be received through the at least one opening of the vehicle frame bracket. The at least one pin includes a locking portion. The apparatus further includes a hinge bracket, wherein the hinge bracket includes at least one opening corresponding to the at least one opening of the vehicle frame bracket. The at least one opening of the hinge bracket is defined by a locking surface configured as a function of the locking portion of the at least one pin such that the at least one pin is locked in a fixed position relative to the hinge bracket when at least a part of the locking portion of the pin is positioned in at least part of the at least one opening of the hinge bracket.

In one embodiment of the apparatus, the locking portion of the pin includes a threaded region, and at least a portion of the locking surface of the hinge bracket is threaded for receiving the threaded region of the pin.

In another embodiment of the apparatus, the locking portion of the pin includes one or more flat surfaces, and the locking surface of the binge bracket includes at least one flat surface configured to correspond to the one or more flat surfaces of the locking portion of the pin.

In yet another embodiment of the apparatus, the at least one pin further includes a threaded end portion configured to be inserted through the at least one opening defined in the vehicle frame bracket and the at least one opening defined in the hinge bracket. Further, the apparatus includes a nut for coupling to the threaded end portion.

In another embodiment of the apparatus, the at least one pin includes an elongated pin end portion extending along a pin axis at an end opposite the threaded end portion of the at least one pin. The at least one pin includes an engagement element (e.g., the engagement element configured with one or more grasping surfaces such that a tool corresponding to such grasping surfaces can be used to hold the engagement element) extending orthogonal to the pin axis at a position between the threaded end portion and the pin end portion to maintain the pin end portion at a position to receive a door bracket of the vehicle when a nut is coupled to the threaded end portion.

In another embodiment, the apparatus further includes a bushing configured for insertion through the at least one opening defined in the vehicle frame bracket, wherein an opening is defined by the bushing, and further wherein the at least one pin is configured for insertion through the opening defined by the bushing.

In yet another embodiment, the vehicle frame bracket includes a first and second opening aligned along and lying orthogonal to a frame bracket axis. In this embodiment, a first pin is configured to be received through the first opening of the vehicle frame bracket and a second pin is configured to be received through the second opening of the vehicle frame bracket. Each of the first and second pins includes a locking portion (e.g., at least one pin includes a material that has a hardness that is greater than about 80 Rockwell B Hardness (HRB)) configured to provide a locking function with locking surfaces of first and second openings of the hinge bracket.

A method for repairing a door hinge according to the present invention is also provided. The door hinge being repaired includes at least a vehicle frame bracket attached to a portion of a vehicle frame and a hinge bracket. The vehicle frame bracket includes a first and second opening aligned along and lying orthogonal to a frame bracket axis. The hinge bracket includes a first and second opening aligned along and lying orthogonal to the frame bracket axis. The vehicle frame bracket and the hinge bracket are coupled using a first pin positioned in the first opening of the vehicle frame bracket and the first opening of the hinge bracket and using a second pin positioned in the second opening of the vehicle frame bracket and the second opening of the hinge bracket.

The repair method includes removing the first and second pins to release the hinge bracket from the vehicle frame bracket and providing a first substitute pin configured to be received through the first opening of the vehicle frame bracket and a second substitute pin configured to be received through the second opening of the vehicle frame bracket (e.g., each of the first and second substitute pins comprise a locking portion). The method further includes providing a substitute hinge bracket that includes a first and second opening aligned orthogonal on a substitute hinge bracket axis. Each of the first and second openings of the substitute hinge bracket are defined by a locking surface configured as a function of the locking portion of the respective first and second substitute pins such that the first substitute pin is locked in a fixed position relative to the substitute hinge bracket when at least a part of the locking portion of the first substitute pin is positioned in the first opening of the substitute hinge bracket and such that the second substitute pin is locked in a fixed position relative to the substitute hinge bracket when at least a part of the locking portion of the second substitute pin is positioned in the second opening of the substitute hinge bracket. To implement the repair, the substitute hinge bracket axis and the vehicle frame bracket axis are aligned and the vehicle frame bracket and the substitute hinge bracket are coupled using the first and second substitute pins.

In one embodiment of the method, the locking portion of each of the first and second substitute pins include a threaded region, and further wherein each locking surface defining the first and second openings of the substitute hinge bracket is threaded for receiving the threaded region of the respective first and second substitute pins. In an alternate embodiment, the locking portion of each of the first and second substitute pins includes one or more flat surfaces, and further wherein each locking surface defining the first and second openings of the substitute hinge bracket comprises at least one flat surface configured to correspond to the flat surface of the locking portion of the respective first and second substitute pins.

In another embodiment, each of the first and second substitute pins includes a threaded end portion. The method then further includes coupling a first nut on the threaded end portion of the first substitute pin after the first substitute pin is inserted through the first opening of the vehicle frame bracket and the first opening of the substitute hinge bracket and coupling a second nut on the threaded end portion of the second substitute pin after the second substitute pin is inserted through the second opening of the vehicle frame bracket and the second opening of the substitute hinge bracket.

In yet another embodiment, each of the first substitute pin and second substitute pin includes an elongated pin end portion extending along a pin axis at an end opposite the threaded end portion of the first substitute pin, and further wherein each of the first substitute pin and second substitute pin includes an engagement element extending orthogonal to the pin axis at a position between the threaded end portion and the pin end portion to maintain the pin end portion at a position to receive a door bracket. Further, the door bracket includes a first opening to be positioned on the pin end portion of the first substitute pin and a second opening to be positioned on the pin end portion of the second substitute pin after the vehicle frame bracket and the substitute hinge bracket are coupled using the first and second substitute pins. Further, the engagement element of each of the first substitute pin and second substitute pin may be configured with one or more grasping surfaces such that coupling the vehicle frame bracket and the substitute hinge bracket using the first and second substitute pins can be assisted by holding and/or turning at least one of the first substitute pin and second substitute pin using a tool corresponding to such grasping surfaces.

In yet another embodiment of the method, removing the first and second pins to release the hinge bracket from the vehicle frame bracket includes removing ends of the first and second pins holding the first and second pins in the openings of the hinge bracket and vehicle frame bracket and pushing the first and second pins out of the openings of the hinge bracket and vehicle frame bracket using a punch tool.

In one embodiment, the punch tool includes a body portion and first and second spaced apart portions extending from the body portion to define a bracket receiving region therebetween configured to receive a portion of the vehicle frame bracket and the hinge bracket when the tool is used to remove one of the first and second pins. Further, one of the first and second spaced apart portions defines a pin receiving region configured to receive one of the first and second pins when the tool is used to remove the pin and the other of the first and second spaced apart portions defines a threaded opening configured to receive a threaded punch screw operable to engage the pin when the tool is being used to remove the pin.

Another apparatus for use in repairing a door hinge of a vehicle is also described herein. The door hinge being repaired includes at least a vehicle frame bracket attached to a portion of a vehicle frame of the vehicle and a hinge bracket (e.g., a factory hinge bracket). The vehicle frame bracket includes at least one opening defined therein and the hinge bracket includes at least one opening corresponding to the at least one opening of the vehicle frame bracket. The apparatus for use in the repair includes at least one pin configured to be received through the at least one opening of the vehicle frame bracket. The at least one pin includes an interference portion to form an interference fit with one or more surfaces defining the at least one opening of the hinge bracket (e.g., factory hinge bracket) when at least a part of the interference portion of the pin is positioned in at least part of the at least one opening of the hinge bracket. The pin further includes a threaded end portion configured to be inserted through the at least one opening defined in the vehicle frame bracket and the at least one opening defined in the hinge bracket for coupling to a nut. Further, the pin includes an elongated pin end portion extending along a pin axis at an end opposite the threaded end portion of the at least one pin. An engagement element extends orthogonal to the pin axis at a position between the threaded end portion and the pin end portion to maintain the pin end portion at a position to receive a door bracket of the vehicle when the nut is coupled to the threaded end portion. The engagement element is configured with one or more grasping surfaces such that a tool corresponding to such grasping surfaces can be used to hold and/or turn the engagement element.

In one embodiment of the apparatus, the vehicle frame bracket includes a first and second opening aligned along and lying orthogonal to a frame bracket axis. The hinge bracket includes a first and second opening aligned along and lying orthogonal to a hinge bracket axis. The hinge bracket axis and the frame bracket axis coincide and the first and second openings of the hinge bracket axis lie adjacent to the first and second openings of the vehicle frame bracket, respectively, when the hinge bracket is assembled with the vehicle frame bracket. In this embodiment, a first pin is configured to be received through the first opening of the vehicle frame bracket and a second pin is configured to be received through the second opening of the vehicle frame bracket. The first pin includes an interference portion to form an interference fit with one or more surfaces defining the first opening of the hinge bracket when at least a part of the interference portion of the first pin is positioned in at least part of the first opening of the hinge bracket and the second pin includes an interference portion to form an interference fit with one or more surfaces defining the second opening of the hinge bracket when at least a part of the interference portion of the second pin is positioned in at least part of the second opening of the hinge bracket.

In another embodiment of the apparatus, the interference portion is configured such that substantially an entire inner surface defining the at least one opening of the hinge bracket is in contact with the interference portion of the at least one pin when at least a part of the interference portion of the pin is positioned in the at least one opening of the hinge bracket.

A method for repairing a door hinge (e.g., without using a substitute hinge bracket) is also described. The door hinge includes at least a vehicle frame bracket attached to a portion of a vehicle frame and a hinge bracket. The vehicle frame bracket includes a first and second opening aligned along and lying orthogonal to a frame bracket axis and the hinge bracket includes a first and second opening aligned along and lying orthogonal to the frame bracket axis. The vehicle frame bracket and the hinge bracket are coupled using a first pin positioned in the first opening of the vehicle frame bracket and the first opening of the hinge bracket and using a second pin positioned in the second opening of the vehicle frame bracket and the second opening of the hinge bracket. The repair method includes removing the first and second pins (e.g., using the punch tool) to release the hinge bracket from the vehicle frame bracket and providing a first substitute pin configured to be received through the first opening of the vehicle frame bracket and a second substitute pin configured to be received through the second opening of the vehicle frame bracket.

At least one of the first and second substitute pins includes an interference portion to form an interference fit with one or more surfaces defining the opening of the hinge bracket in which the at least one substitute pin is to be received and a threaded end portion configured to be inserted through the opening defined in the vehicle frame bracket and the opening defined in the hinge bracket for coupling to a nut. An elongated pin end portion extends along a pin axis at an end opposite the threaded end portion of the at least one pin. The at least one substitute pin further includes an engagement element extending orthogonal to the pin axis at a position between the threaded end portion and the pin end portion to maintain the pin end portion at a position to receive a door bracket of the vehicle when the nut is coupled to the threaded end portion. The engagement element is configured with one or more grasping surfaces such that a tool corresponding to such grasping surfaces can be used to hold and/or turn the engagement element. The repair method further includes aligning the hinge bracket and the vehicle frame bracket and coupling the vehicle frame bracket and the hinge bracket using the first and second substitute pins, wherein coupling the vehicle frame bracket and the hinge bracket includes using the tool corresponding to the grasping surfaces to hold and/or turn at least one of the first and second substitute pins.

In one embodiment of the method, the interference portion is configured such that substantially an entire inner surface defining the opening of the hinge bracket is in contact with the interference portion of the substitute pin when at least a part of the interference portion of the substitute pin is positioned in the opening of the hinge bracket.

The above summary of the present invention is not intended to describe each embodiment or every implementation of the present invention. For example, the apparatus and the punch tool may be provided as a kit, portions of the apparatus may be provided and/or used separately or in combination, the punch tool may be provided separately, etc. Advantages, together with a more complete understanding of the invention, will become apparent and appreciated by referring to the following detailed description and claims taken in conjunction with the accompanying drawings.

BRIEF DESCRIPTION OF THE DRAWINGS

FIG. 13C further shows the threaded screw and the punch-out block tool thereof being positioned relative to a factory hinge such as that shown in FIG. 1A.

FIG. 15A is a side view of an upper pin shown in FIG. 14.

FIG. 15B is a top view of the upper pin shown in FIG. 15A.

FIG. 16A is a side view of a lower pin shown in FIG. 14.

FIG. 16B is a top view of the lower pin shown in FIG. 16A.

DETAILED DESCRIPTION OF THE EMBODIMENTS

Figure 1A:
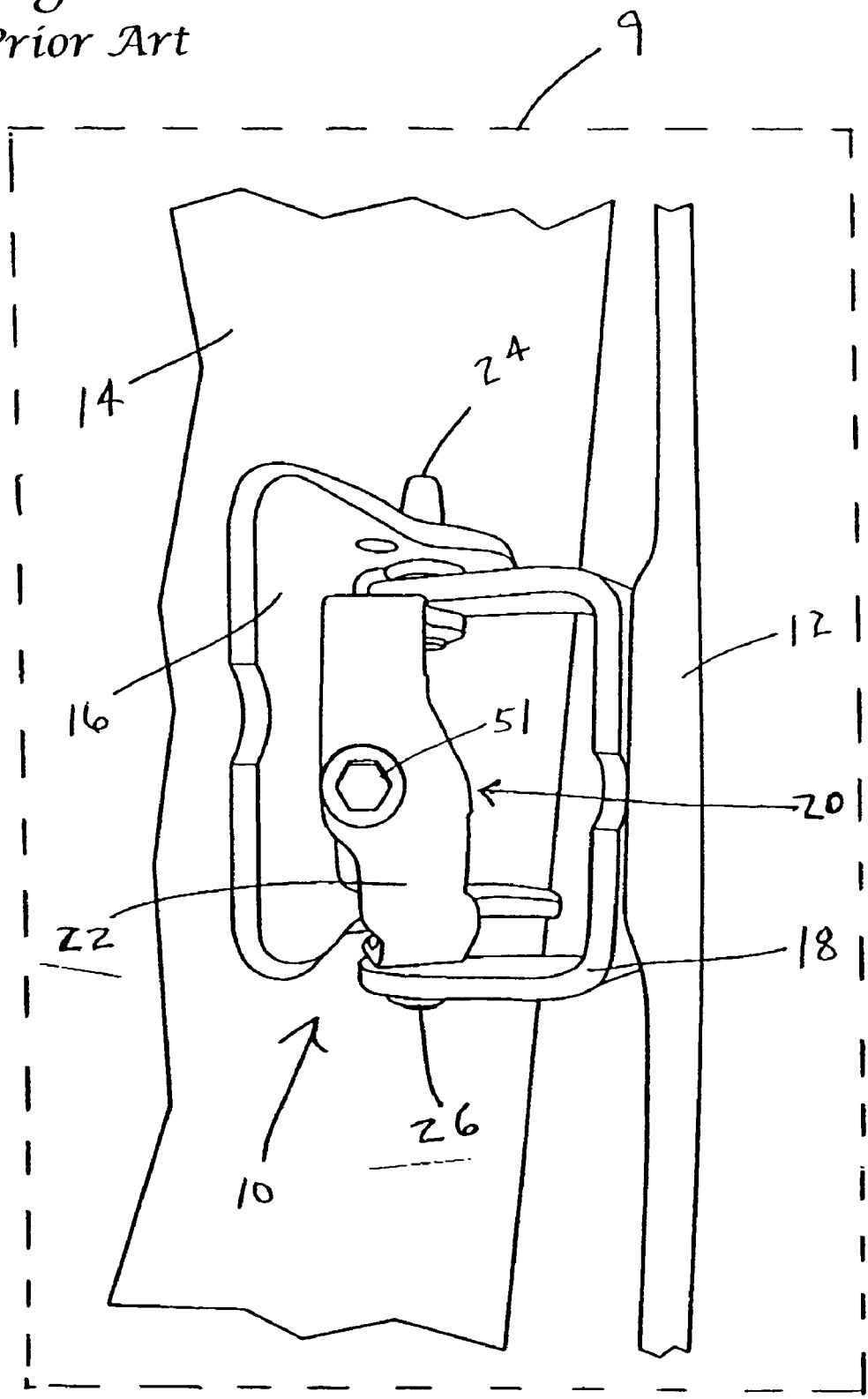
FIG. 1A is a perspective view of a factory door hinge mounting a door to a vehicle frame.
Figure 1B:
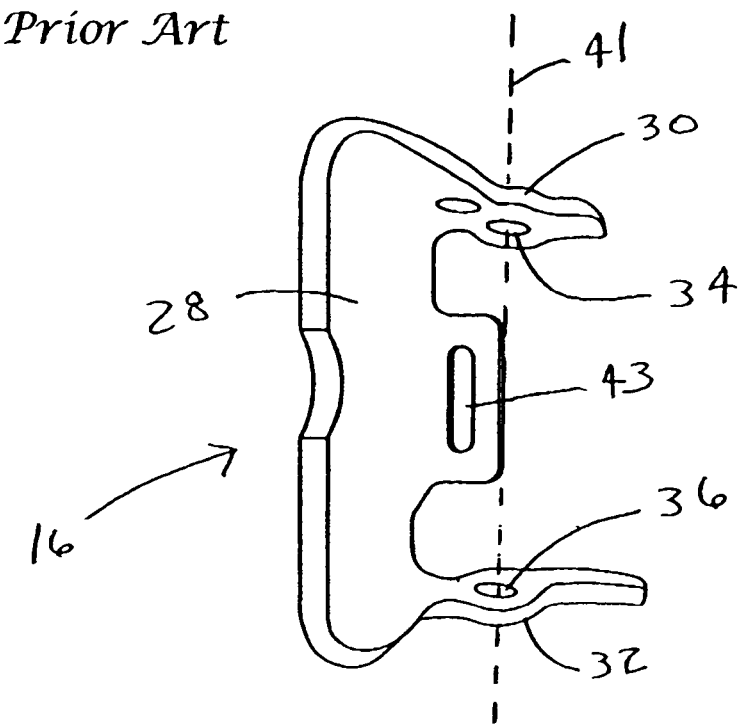
FIG. 1B is a perspective view of a factory door bracket of the factory hinge as shown in FIG. 1A.

Apparatus, kits, systems, and methods shall first generally be described with reference to FIGS. 3–10, wherein an illustrative and exemplary door hinge pin and bracket apparatus 60 according to the present invention is shown. For example, the hinge pin and bracket apparatus 60 may be used to repair a factory hinge (e.g., a hinge provided on a new vehicle) such as factory hinge 10 shown generally in FIGS. 1–2. Thereafter, another illustrative and alternate embodiment of a hinge pin and bracket apparatus shall be described with reference to FIGS. 11A–11C. Further, a punch-out block tool for use in repair of a factory hinge such as that shown in FIGS. 1–2 shall be described generally with reference to FIGS. 12–13. Yet further, another illustrative and alternate embodiment of a hinge pin apparatus shall be described with reference to FIGS. 14–16 which uses the factory hinge bracket for the repair as opposed to use of a substitute hinge bracket.

Various embodiments, according to the present invention, may be implemented as described herein. It is noted that various combinations of elements may provide the functionality described herein and that various structure and process steps described herein may be included and/or may be optional according to the present invention. It will be recognized that the drawings provided herein are for illustrative purposes only and are not necessarily shown to scale.

Further, one or more features of each of the embodiments may be modified and still perform the same functionality or additional functionality without departing from the scope of the present invention. For example, the size of threads for various portions of the pins described herein may vary, the diameter of the pins at various regions thereof may vary (e.g., for example, the threaded portions may be provided at a different diameter than one or more other portions of the pin to provide larger shoulders or engagement surfaces enhancing contact areas with other components), and various shapes and sizes of bracket or pin components may be used (e.g., hinge brackets may have curved corners versus straight corners, various tabs or openings may be provided in one or more brackets, the shape and/or configuration of the pins and brackets may vary to accommodate coupling of one or more components described herein, etc.).

Figure 1C:
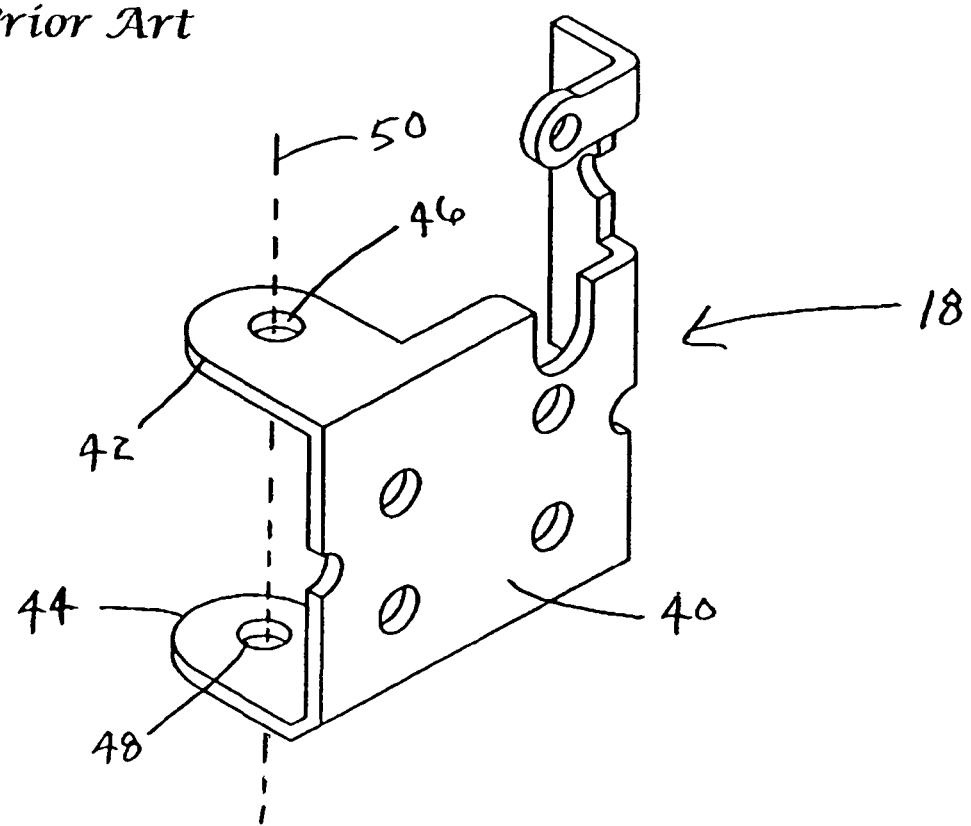
FIG. 1C is a perspective view of a factory vehicle frame bracket of the factory hinge as shown in FIG. 1A.
Figure 2:
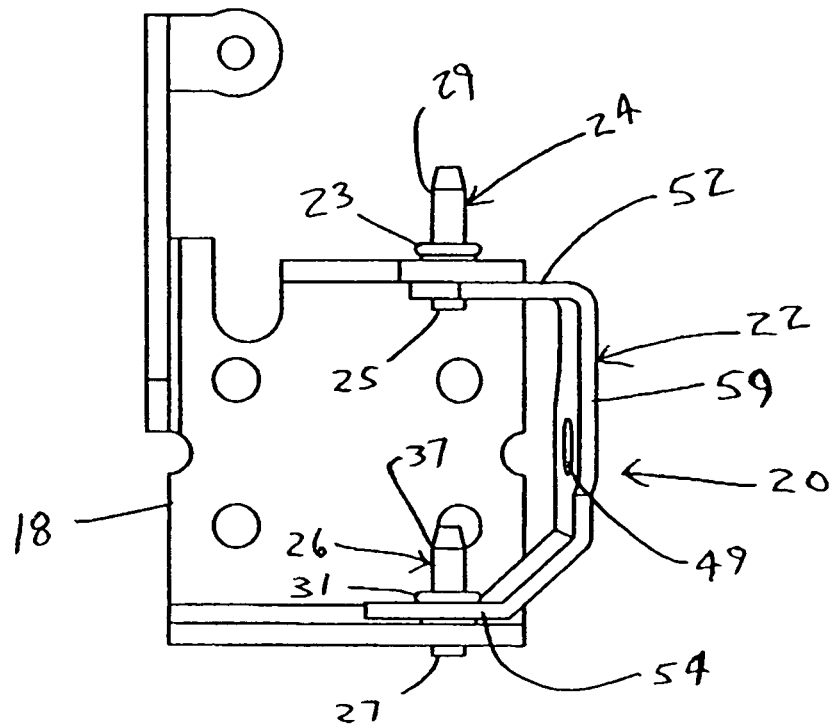
FIG. 2 is a diagrammatic illustrative view of a factory hinge bracket assembly coupled to a factory vehicle frame bracket such as shown in FIG. 1A.
Figure 3:
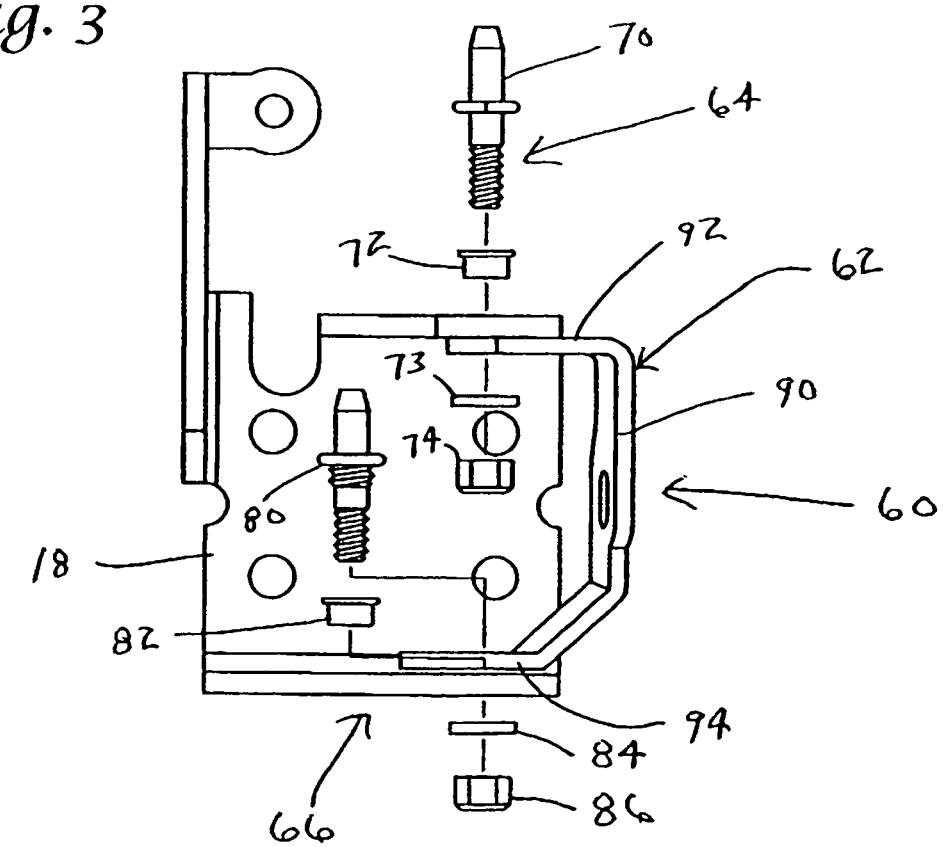
FIG. 3 is an exploded view of a hinge pin and bracket apparatus according to the present invention shown in relation to a factory vehicle frame bracket for a driver's side of a vehicle.
Figure 4:
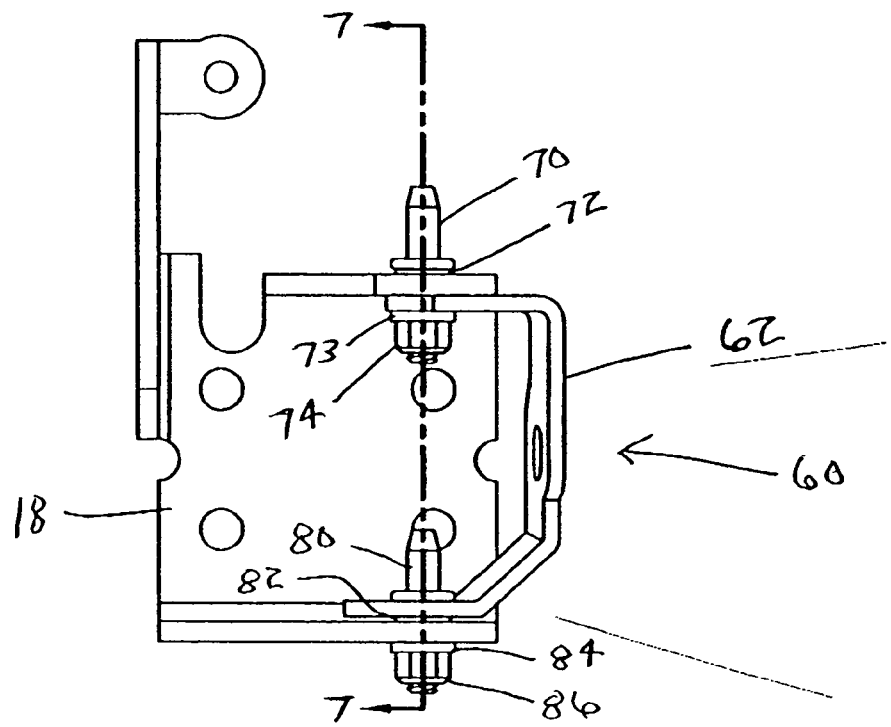
FIG. 4 shows an assembled view of the components shown in FIG. 3 according to the present invention.

One or more components as described herein may be provided as a repair kit for the repair of a factory hinge such as that shown and described with reference to FIGS. 1–2. For example, the hinge pin and bracket apparatus 60, as shown in FIG. 3, includes components (e.g., upper hinge pin components 64 and lower hinge pin components 66, as well as substitute hinge bracket 62) for repair of a driver's side door hinge 10. One skilled in the art will recognize that one or more of such kit elements may be optional. For example, washers (e.g., lock washers) shown as part of upper hinge pin components 64 and lower hinge pin components 66 may optionally be used according to the present invention. Further, a kit may be provided with any combination of the repair components described herein.

Upper hinge pin components 64, at least in one embodiment, include upper pin 70, upper bushing 72, upper washer 73, and upper lock nut 74. Likewise, lower hinge pin components 66 include lower pin 80, lower bushing 82, lower washer 84, and lower lock nut 86. Such components 64, 66 are shown unassembled in the exploded view of FIG. 3 along with a factory vehicle frame bracket 18, as well as separately in the exploded view of FIG. 6. Such components 64, 66 are shown assembled in combination with hinge bracket 62 in relation to vehicle frame bracket 18 in the assembled view of FIG. 4 and the cross-section view of FIG. 7 taken at line 7—7 of FIG. 4.

Figure 5:
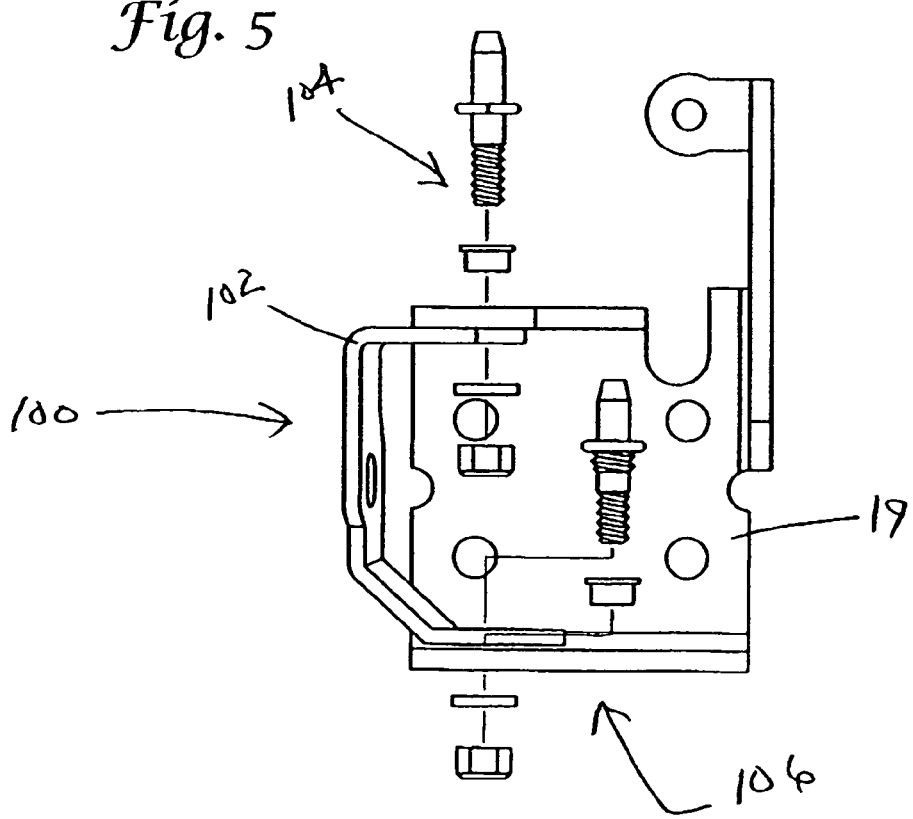
FIG. 5 shows an exploded view of a hinge pin and bracket apparatus for a passenger side of a vehicle according to the present invention in relation to a factory vehicle frame bracket for the passenger's side of the vehicle.
Figure 6:
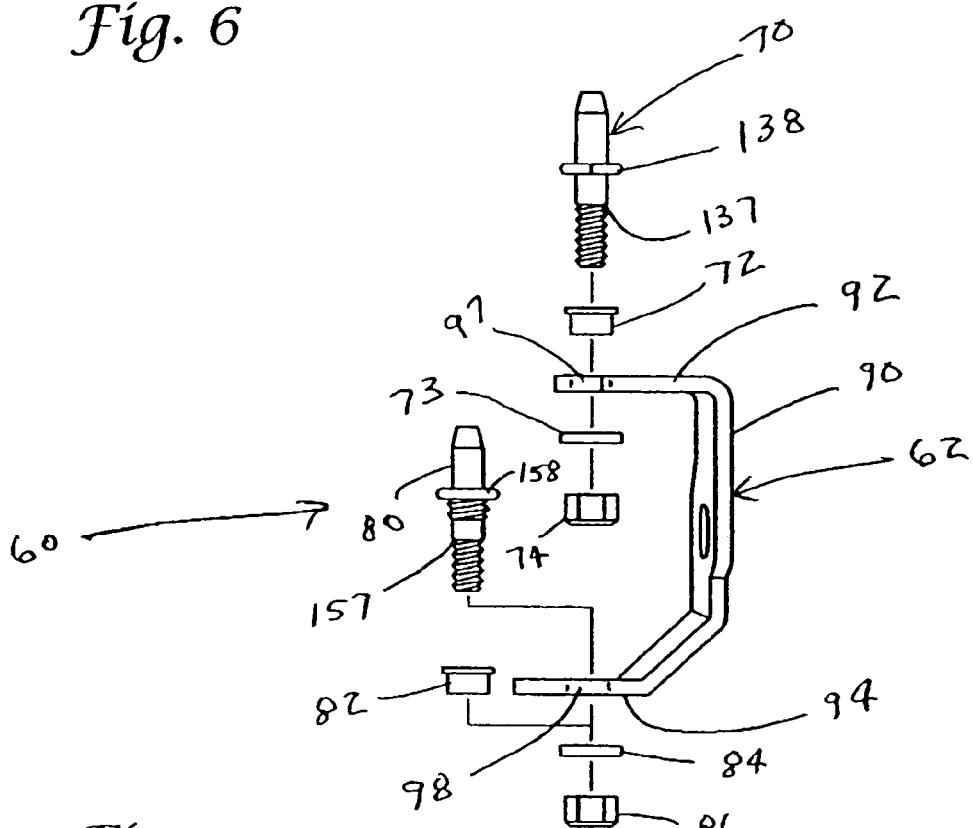
FIG. 6 is an exploded view of the hinge pin and bracket apparatus shown in FIG. 3 apart from the vehicle frame bracket.
Figure 7:
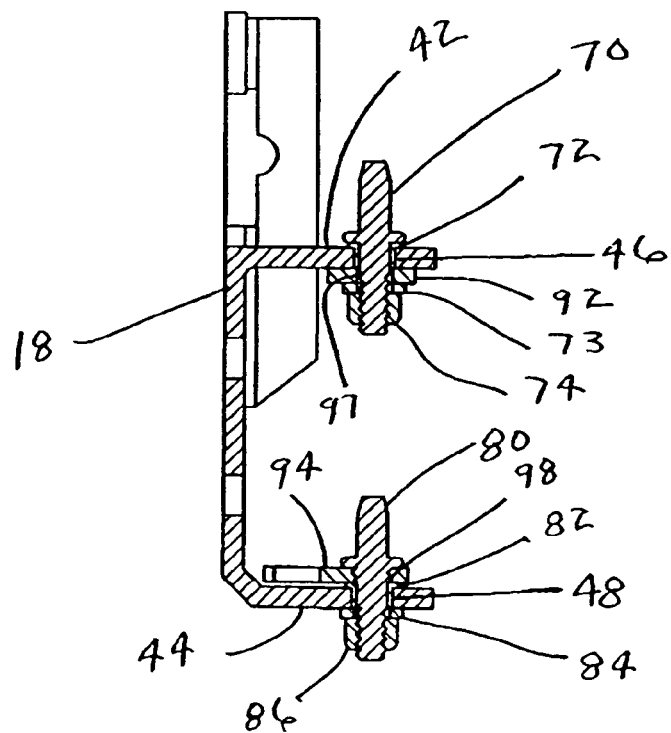
FIG. 7 is a cross-section taken at line 7—7 of FIG. 4 showing an assembled hinge pin and bracket apparatus according to the present invention in relation to a vehicle frame bracket.

FIG. 5 shows an exploded view of a hinge pin and bracket apparatus 100 for a passenger side hinge repair in relation to a passenger side vehicle frame bracket 19. The passenger side hinge pin and bracket apparatus 100 includes passenger side hinge bracket 102, upper hinge pin components 104, and lower hinge pin components 106. As one skilled in the art will recognize, the passenger side components are merely a mirror image of the driver's side components and as such shall not be described in any further detail herein.

Figure 8A:
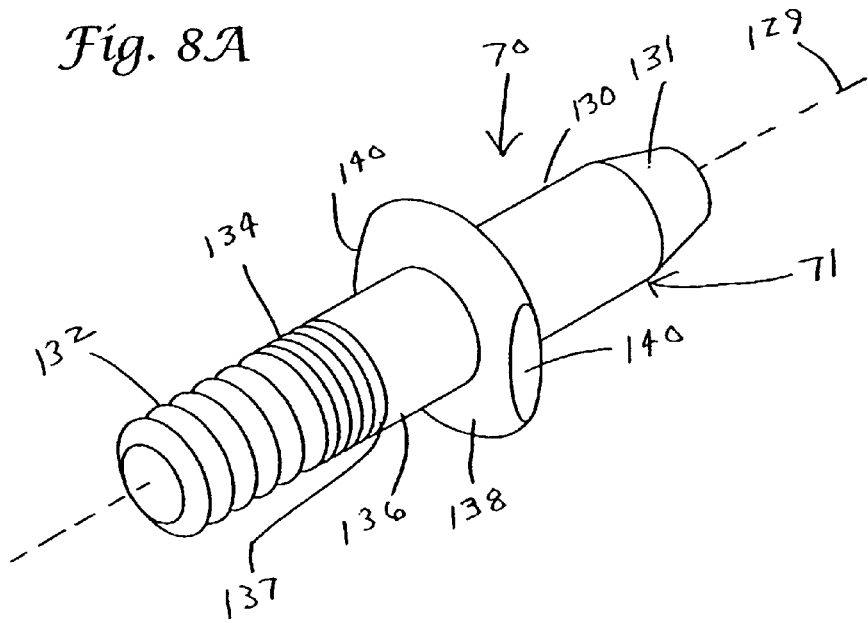
FIG. 8A is a perspective view of one embodiment of an upper pin such as generally shown in FIGS. 3–4 and 6–7.
Figure 8B:
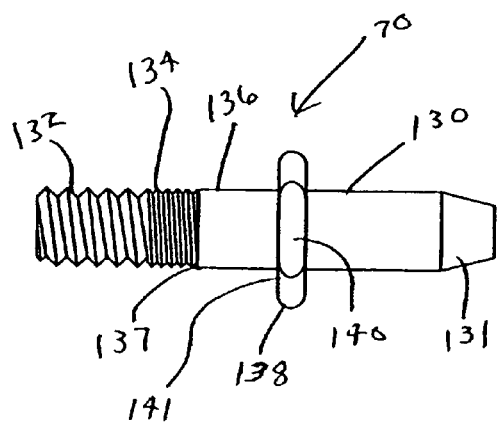
FIG. 8B is a side view of the upper pin shown in FIG. 8A.
Figure 8C:
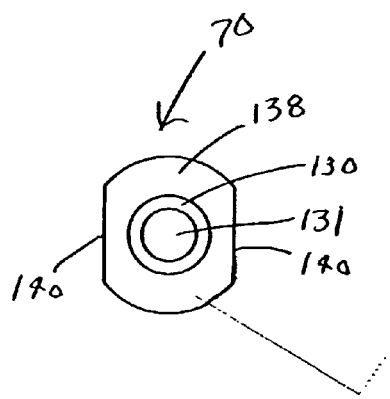
FIG. 8C is a top view of the upper pin shown in FIGS. 8A–8B.

FIGS. 8A–8C show a perspective view, a side view, and a top view of one embodiment of an upper hinge pin 70 shown generally in FIGS. 3–4 and 6–7 according to the present invention. The upper hinge pin 70 includes an elongated body portion 71 extending from a threaded end portion 132 to a pin end portion 130 along axis 129.

A locking surface 134 lies along the axis 129 between the threaded end portion 132 and the pin end portion 130. The locking surface 134, as shall be described further herein, is shown as a threaded portion in FIGS. 8A–8B.

Figure 10:
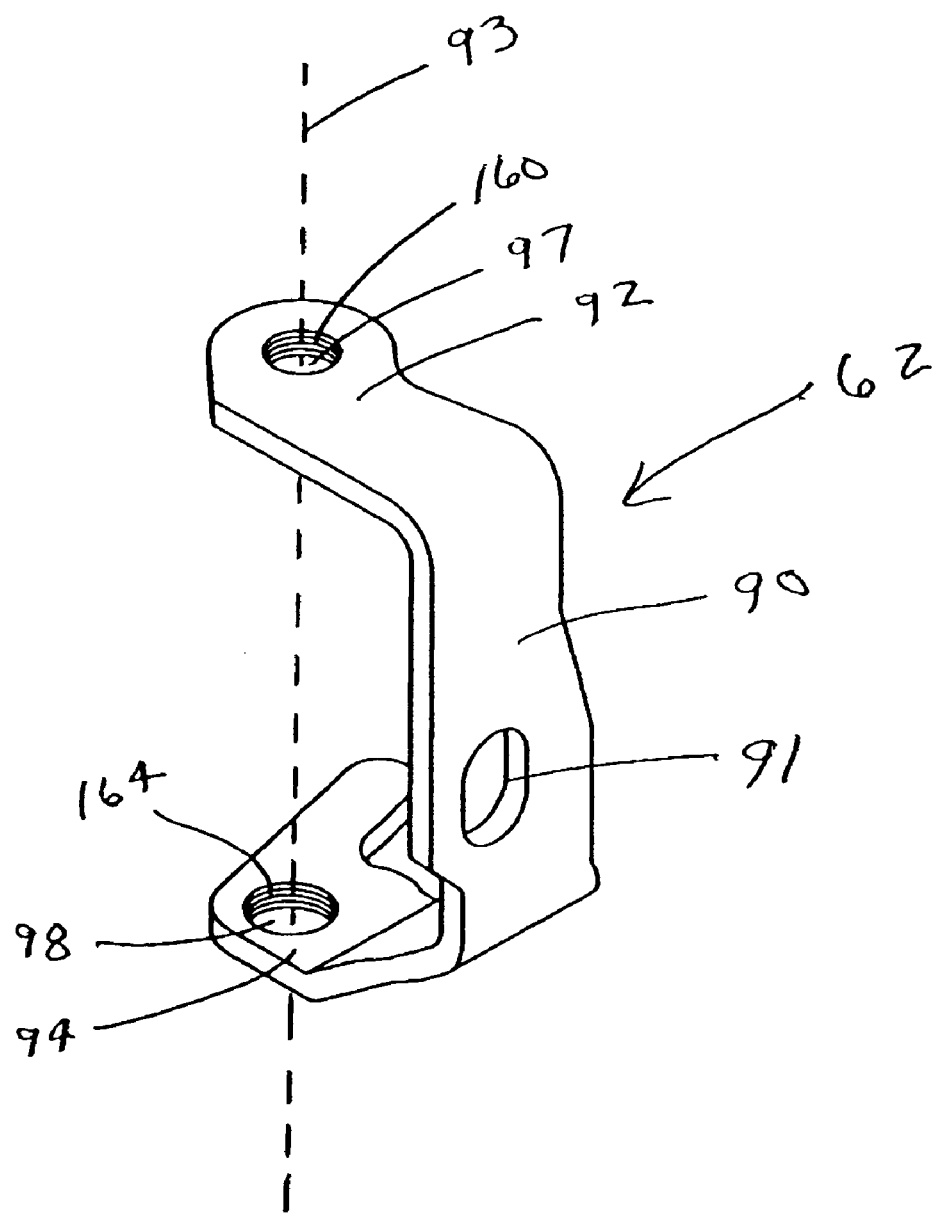
FIG. 10 is a perspective view of one embodiment of a hinge bracket as shown generally in FIGS. 3–4 and FIGS. 6–7.

However, according to the present invention, any locking surface that provides for a locking functionality between the upper pin 70 and the hinge bracket 62 when the pin 70 is positioned within upper opening 97 of hinge bracket 62, as shall be described further herein with reference to FIG. 10, may be used. Locking functionality refers to any configuration that does not allow the pin to move relative to the hinge bracket 62 when assembled therewith. For example, other locking surfaces shall be described herein with reference to FIGS. 11A–11C.

Also lying along axis 129 between threaded end portion 132 and pin end portion 130 is smooth surface 136. As will be recognized upon reading of the description relating to the assembled hinge pin and bracket apparatus 60, smooth surface 136 generally corresponds to an opening of bushing 72 through which the upper hinge pin 70 is inserted (e.g., the smooth surface 136 is generally adjacent an inner surface of bushing 72 when assembled).

As shown in FIG. 8A, the smooth surface 136 lies between the locking surface 134 and pin end portion 130. At the interface between smooth surface 136 and locking surface 134 is a shoulder 137. Although shown as a very small shoulder at the interface between smooth surface 136 and locking surface 134, one will recognize that by changing the diameter of the smooth surface 136 or the locking surface 134, that such shoulder 137 may be enlarged and provide even a greater contact area for use in coupling with other components of the hinge pin and bracket apparatus 60, as shall be described further herein.

The upper hinge pin 70 further includes an engagement element 138 lying along axis 129 and which extends further radially from axis 129 than other portions of the elongated pin body portion 71. As such, a lower surface 141 is provided for contact with other components so as to maintain pin end portion 130 available to receive a factory door bracket, such as factory door bracket 16 shown and described with reference to FIGS. 1A–1B. The pin end portion 130 further includes a tapered end 131 for ease in receiving the factory door bracket 16 as the opening 34 of the factory door bracket 16 is placed over the tapered end 131.

The engagement element 138 further includes one or more grasp surfaces 140. The one or more grasp surfaces 140 are configured in a corresponding manner to one or more tools capable of grasping and holding (and/or turning) the upper pin 70 as the hinge pin and bracket apparatus 60 is being assembled in relation to hinge bracket 62 and/or vehicle frame bracket 18, as shall be further described herein. One skilled in the art will recognize that such grasping surfaces 140 may be flat surfaces that can be grasped (i.e., to hold the pin 70) by a wrench, a socket, or any other tool capable of grasping and holding (and/or turning) the upper hinge pin 70 during assembly. For example, the grasp surfaces 140 may include six flat surfaces in the form of substantially a hexagon such that a socket wrench may be used to hold the upper hinge pin 70.

One skilled in the art will recognize that the diameter of the various regions of upper hinge pin 70 will vary depending upon the hinge bracket 62 as well as openings of other components to which it is coupled. Further, the size of the threads of threaded end portion 132 and locking surface 134 may be the same or may be different, as shown in FIGS. 8A–8B.

Figure 9A:
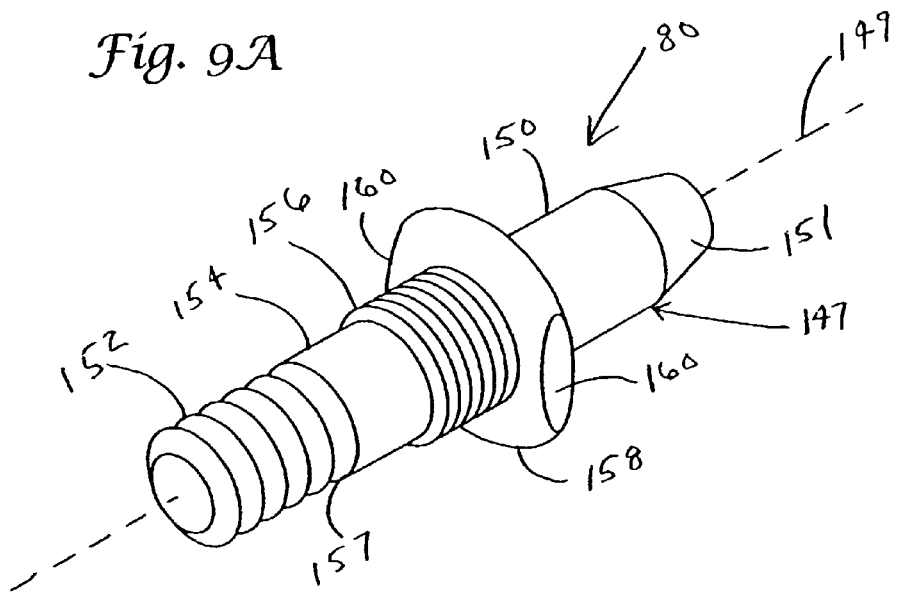
FIG. 9A is a perspective view of one embodiment of a lower pin such as shown generally in FIGS. 3–4 and FIGS. 6–7.
Figure 9B:
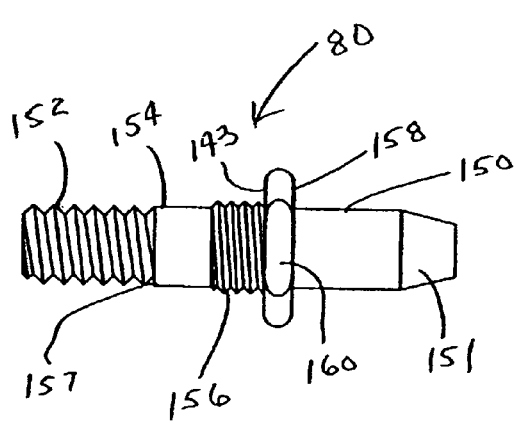
FIG. 9B is a side view of the lower pin shown in FIG. 9A.
Figure 9C:
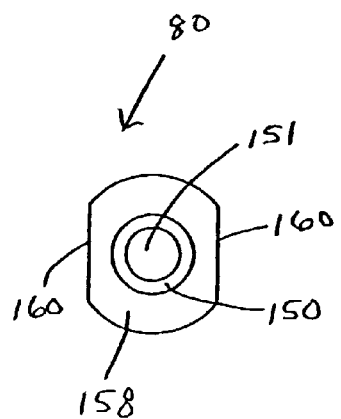
FIG. 9C is a top view of the lower pin shown in FIGS. 9A–9B.

FIGS. 9A–9C show a perspective view, a side view, and a top view of one embodiment of a lower hinge pin 80 shown generally in FIGS. 3–4 and 6–7 according to the present invention. The lower hinge pin 80 includes an elongated body portion 147 extending from a threaded end portion 152 to a pin end portion 150 along axis 149.

A locking surface 156 lies along the axis 149 between the threaded end portion 152 and the pin end portion 150. The locking surface 156, as shall be described further herein, is shown as a threaded portion in FIGS. 9A–9B. However, as described above with respect to the upper hinge pin 70, any locking surface that provides for a locking functionality between the lower hinge pin 80 and a lower opening 98 of hinge bracket 62, as shall be described further herein with reference to FIG. 10, may be used.

Also lying along axis 149 between threaded end portion 152 and pin end portion 150 is smooth surface 154. As will be recognized upon reading of the description relating to the assembled hinge pin and bracket apparatus 60, smooth surface 154 generally corresponds to an opening of bushing 82 through which the lower hinge pin 80 is inserted (e.g., the smooth surface 154 is generally adjacent an inner surface of bushing 82 when assembled).

As shown in FIG. 9A, the smooth surface 156 lies between the threaded end portion 152 and locking surface 156. At the interface between threaded end portion 152 and smooth surface 154 is a shoulder 157. Although shown as a very small shoulder at the interface between threaded end portion 152 and smooth surface 154, one will recognize that by changing the diameter of the smooth surface 154 or the threaded end portion 152, that such shoulder 157 may be enlarged and provide even a greater contact area for use in coupling with other components of the hinge pin and bracket apparatus 60, as shall be described further herein.

The lower hinge pin 80 further includes an engagement element 158 lying along axis 149 and which extends further from axis 149 than other portions of the elongated pin body portion 147. As such, a lower surface 143 is provided for contact with other components so as to maintain pin end portion 150 available to receive a factory door bracket, such as factory door bracket 16 shown and described with reference to FIGS. 1A–1B. The pin end portion 150 further includes a tapered end 151 for ease in receiving the factory door bracket 16 as the opening 36 of the factory door bracket 16 is placed over the tapered end 151.

The engagement element 158 further includes one or more grasp surfaces 160. The one or more grasp surfaces 160 are configured in a corresponding manner to one or more tools capable of grasping and holding (and/or turning) the lower pin 80 as the hinge pin and bracket apparatus 60 is being assembled in relation to hinge bracket 62 and/or vehicle frame bracket 18, as shall be further described herein. One skilled in the art will recognize that such grasping surfaces 160 may be the same or different than those described with reference to upper hinge pin 70.

One skilled in the art will recognize that the diameter of the various regions of lower hinge pin 80 will vary depending upon the hinge bracket 62 as well as openings of other components to which it is coupled. Further, the size of the threads of threaded end portion 152 and locking surface 156 may be the same or may be different, as shown in FIG. 9A–9B.

A perspective view of one embodiment of hinge bracket 62 shown generally in FIGS. 3–4 and 6–7 according to the present invention is shown in FIG. 10. The hinge bracket 62 is, at least in one embodiment, of the same shape and size as factory hinge bracket 22 for which it is to replace. However, instead of having openings like those of the factory hinge bracket 22 through which factory pins are inserted, the hinge bracket 62 to be substituted for the factory hinge bracket 22 includes openings 97, 98 defined therein by locking surfaces 160, 164, respectively, which correspond to locking surfaces 134, 156 of upper hinge pin 70 and lower hinge pin 80, respectively.

Preferably, hinge bracket 62 is produced by stamping of a planar sheet of metal and thereafter bending the stamped component to a configuration for use in repair of a factory hinge 10, such as that described with reference to FIGS. 1–2. The locking surfaces 160, 164 provided in hinge bracket 62 may either be produced during the stamping process or by one or more later processes (e.g., a thread cutting process).

As shown in FIG. 10, the hinge bracket 62 includes a bracket body 90 with two spaced apart extension members 92, 94 extending therefrom. At least in one embodiment, such extension members 92, 94 each have at least a portion which are substantially parallel to one another. An opening 97 is defined in the upper extension member 92 and an opening 98 is defined in the lower extension member 94. Such openings 97, 98 lie substantially orthogonal to hinge bracket axis 93. Generally, the distance between upper extension member 92 and lower extension member 94 is such that the hinge bracket 62 may be inserted between extension members 42, 44 of vehicle frame bracket 18, such as described with reference to FIGS. 1–2. As shown in FIG. 10, the locking surfaces 160, 164 include threaded surfaces corresponding to the threaded locking surface regions 134, 156 of upper hinge pin 70 and lower hinge pin 80, respectively.

The substitute hinge bracket 62 (e.g., substitute for a factory hinge bracket) also includes bolt opening 91 in substantially the same location as the factory hinge bracket (e.g., hinge bracket 22) which it is to replace. As such, hinge bracket 62, at least in one embodiment, includes substantially all the features present in the factory hinge which it is to replace.

With provision of hinge pin and bracket apparatus 60, a method of repairing a factory hinge (e.g., a factory hinge 10 shown and described with reference to FIGS. 1–2) shall be described with reference to FIGS. 1–10. Although such a repair method is described herein with reference to factory hinge 10, shown and described with reference to FIGS. 1–2, one skilled in the art will recognize that various types of hinges may be repaired in the same or a similar manner.

To begin the repair process, the driver's side door 14 is removed from the vehicle 9. Generally, removal of door 14 is described in a factory provided manual and may include one or more various steps. As is clear from FIG. 1, the removal of driver's side door 14 would include at least removal of factory bolt 51 which couples the factory hinge bracket 22 to the factory door bracket 16. Likewise, the driver's side door 14 must then be lifted off of upper factory pin 24 and lower factory pin 26. The peened ends 25, 27 of upper factory pin 24 and lower factory pin 26, respectively, must then be removed. For example, any sort of removal method may be used, such as, for example, grinding off of the peened ends 25, 27.

Thereafter, the upper factory pin 24 and the lower factory pin 26 are removed. For example, such factory pins 24, 26 may be removed using a hole punch. However, preferably, any method suitable to remove the upper and lower pins 24, 26 without bending the vehicle frame bracket 18 can be utilized.

Figure 12:
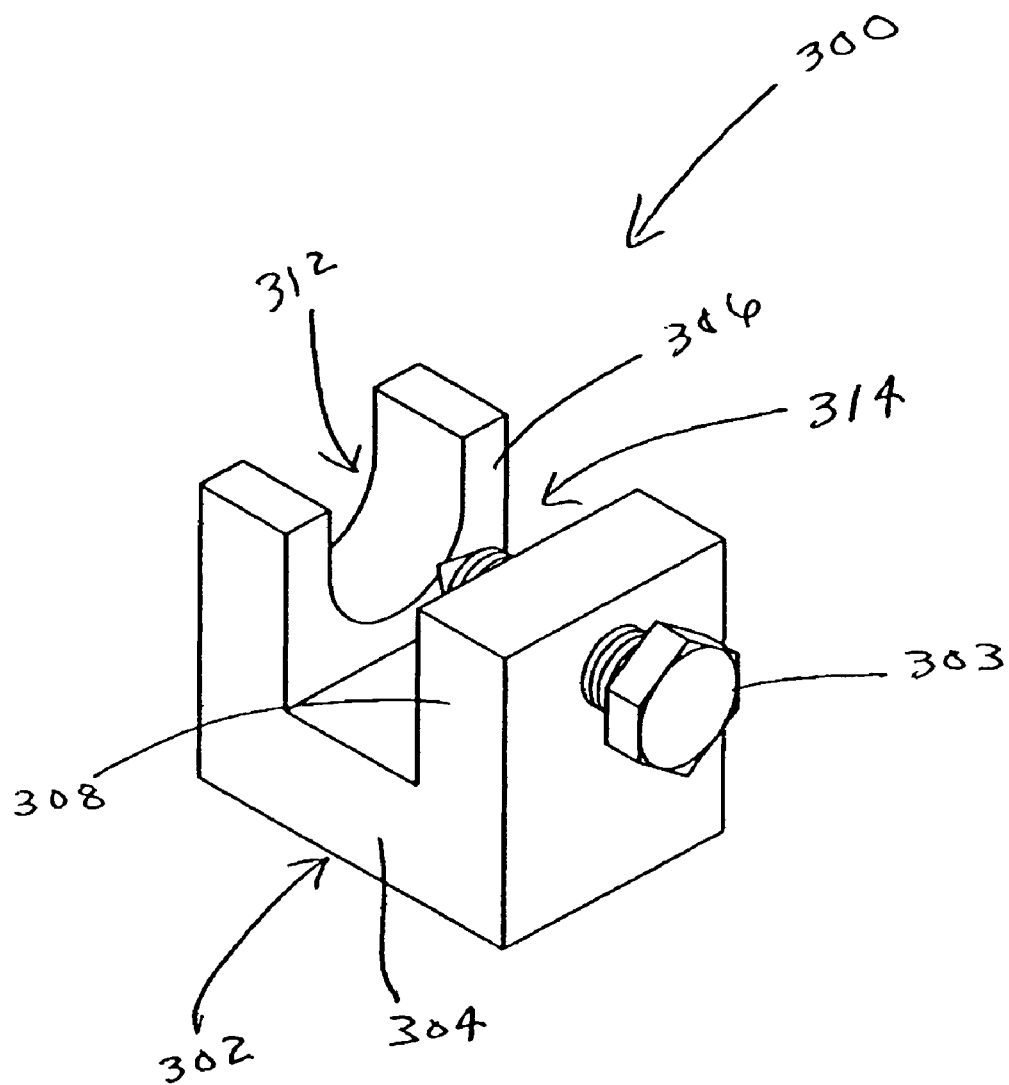
FIG. 12 is a perspective view of a punch-out block tool that may be used according to the present invention to remove factory pins such as those shown in FIGS. 1A and 2.
Figure 13A:
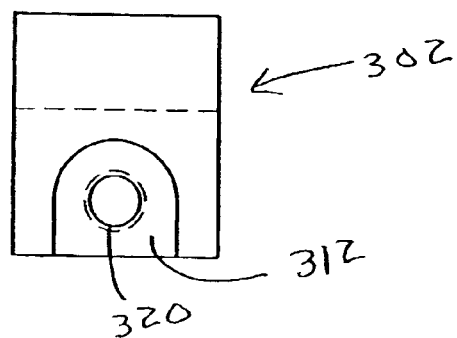
FIGS. 13A–13C show an end view, a plan view, and a side view of the punch-out block tool shown in FIG. 12.
Figure 13B:
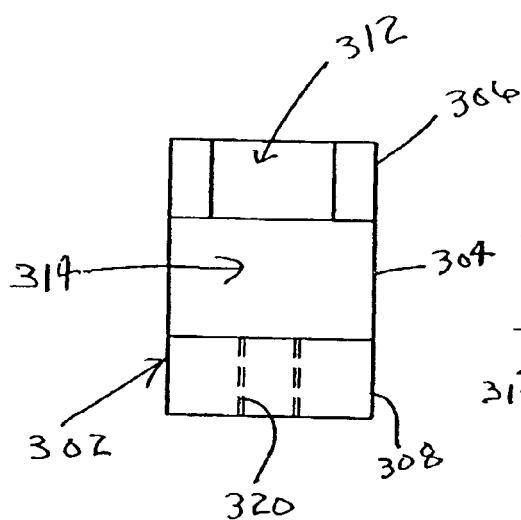
Figure 13C:
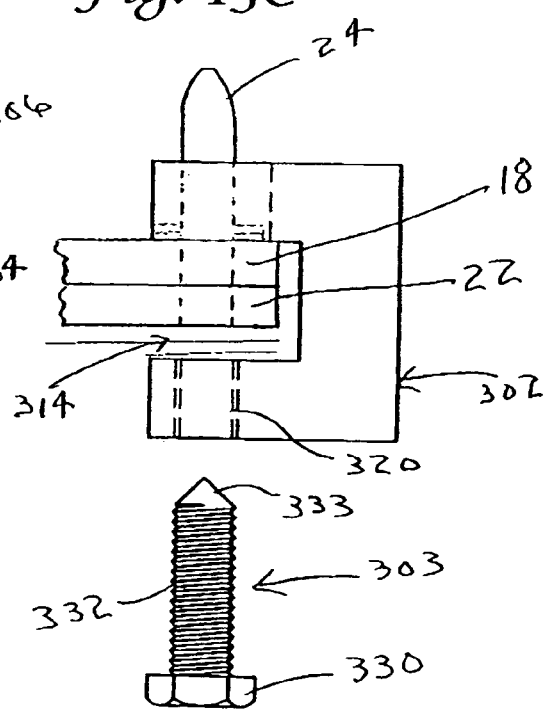

In one embodiment, the punch-out block tool 302, as shown in FIGS. 12–13, may be used to remove the upper and lower factory pins 24, 26. The punch-out block tool 302 includes a body portion 304 having spaced apart extension portions 306, 308 extending therefrom (e.g., extensions generally parallel to one another and/or orthogonal to a linear body portion). The space between the extension portions 306, 308 provide a bracket receiving opening 314 sized to receive at least a portion of vehicle frame bracket 18 and the factory hinge bracket 22, as shown in the side view of FIG. 13C.

The extension portion 306 further defines a pin receiving opening 312 sized to receive one of upper factory pin 24 or lower factory pin 26 therein. As shown in the end view of FIG. 13A, the plan view of FIG. 13B, and the side view of FIG. 13C, the extension portion 308 defines a threaded screw opening 320 sized to receive a threaded screw 303.

In one illustrative example, removal of upper factory pin 24 using the punch-out block tool 302 will be described. One will recognize that the removal of the lower factory pin 26 can be accomplished in a similar manner.

To remove the upper factory pin 24, the factory hinge bracket 22 is repositioned to allow fitting of the punch-out block tool 302 for removal of the upper factory pin 24, as shown in FIG. 13C. For example, the upper factory pin 24 is received in receiving opening 312 of the punch-out block tool 302. Further, upper extension member 42 of vehicle frame bracket 18, as well as extension member 52 of factory hinge bracket 22, are received within bracket receiving opening 314 of the punch-out block tool 302.

With such components in the defined openings 312, 314, the threaded screw 303 may be used to remove the upper factory pin 24. The threaded screw 303 includes a threaded portion 332 sized for mating with threaded screw opening 320, a head configured to be grasped by a corresponding tool (e.g., a hex socket), and an engagement point 333 opposite the head 330. The engagement point 333 may include any surface configured to engage the ground off end of upper factory pin 24.

To remove the upper factory pin 24, the threaded screw 303 is turned through threaded opening 320. Engagement point 333 of the threaded screw 303 engages the ground off end of factory pin 24. Using the leverage of the vehicle frame bracket 18, turning of the threaded screw 303 pushes the upper factory pin 24 out of the opening defined in upper extension member 52 of factory hinge bracket 22 as well as out of upper opening 46 defined in upper extension member 42 of the vehicle frame bracket 18. With such leverage, the pin is pushed out without bending or twisting the vehicle frame bracket 18 due to the engagement or direct contact of the extension portion 306 with the upper extension member 42 of vehicle frame bracket 18.

After removal of the upper factory pin 24 and lower factory pin 26, old worn out bushings can also be removed. As the repair of the factory hinge 10 uses a substitute hinge pin and bracket apparatus 60, according to the present invention, the factory hinge bracket 22, upper and lower factory pins 24, 26, and factory bushings may be discarded, as they are no longer needed.

With the vehicle frame bracket 18 (e.g., the vehicle frame bracket 18 typically being welded to the vehicle 9) being separated from the factory hinge bracket 22 (e.g., factory pins and bushings removed), the substitute hinge bracket 62 of hinge pin and bracket apparatus 60 may be assembled with the vehicle frame bracket 18 using upper hinge pin components 64 and lower hinge pin components 66 of the hinge pin and bracket apparatus 60. Such assembly will be described with particular reference to FIGS. 3–4 and FIGS. 6–7. It will be apparent to one skilled in the art that one or more of the steps described in the repair of the hinge may be performed in a different order and/or may be optional.

First, the upper bushing 72 (e.g., a cylindrical element including a lip on one end and an opening defined therethrough) is positioned into upper opening 46 defined in upper extension member 42 of the vehicle frame bracket 18 (e.g., the lip of the bushing rests on vehicle frame bracket 18 keeping it from falling through the opening). Likewise, lower bushing 82 (e.g., a cylindrical element including a lip on one end and an opening defined therethrough) is positioned into lower opening 48 defined in lower extension member 44 of vehicle frame bracket 18 (e.g., the lip of the bushing rests on vehicle frame bracket 18).

The substitute hinge bracket 62 of the hinge pin and bracket apparatus 60 is placed into position between upper and lower extension members 42, 44 of the vehicle frame bracket 18. The hinge bracket 62 is positioned such that the hinge bracket axis 93 and the factory frame bracket axis 50 coincide which provides for alignment of upper and lower openings 46, 48 defined in vehicle frame bracket 18 and upper and lower openings 97, 98 defined in hinge bracket 62.

With the openings 46, 48 aligned with openings 97, 98, the upper hinge pin 70 may be slid down through the upper bushing 72 which is already positioned in the upper opening 46 defined in the upper extension member 42 of the vehicle frame bracket 18. The locking surface 134 of the upper hinge pin 70 (e.g., the threaded locking surface 134) is then threaded into the threaded locking surface 160 defining opening 97 of the hinge bracket 62. The upper hinge pin 70 is tightened within the threaded locking surface 160 of hinge bracket 62 until it is seated securely in the substitute hinge bracket 62. A tool corresponding to the grasping surface 140 of engagement element 138 may be used to tighten the pin 70 until securely seated (e.g., a 15 millimeter open-ended wrench may be used to tighten the pin 70) in the substitute hinge bracket 62.

Thereafter, a washer 73 is slid over threaded end portion 132 of the upper binge pin 70. Upper lock nut 74 is then threaded on the threaded end portion 132 and tightened (e.g., a $5/16^{th}$-inch nut is hand-tightened). Preferably, air tools are not used so as to prevent over-tightening.

In one embodiment, the dimensions of the pin and/or the bushing 72 may be selected to reduce adverse effects from inadvertent over-tightening of the nut 74. For example, in one embodiment, the smooth surface 136 may have a sufficient length such that the shoulder 137 extends below a lower surface of the upper extension member 42 when inserted into upper opening 46 thereof defined in the vehicle frame bracket 18. As a result, the nut 74 may be tightened against the shoulder 137 rather than the vehicle frame bracket 18. Over-torquing of the nut 74 does not, therefore, cause clamping of the hinge bracket 62 against the vehicle frame bracket 18.

Likewise, the length of upper bushing 72 (i.e., along hinge bracket axis 93 when assembled) may also be sized such that the bushing extends below the lower surface of the upper extension member 42 of the vehicle frame bracket 18. As such, tightening of the nut 74 is against an end of the bushing extending below the vehicle frame bracket 18 rather than the vehicle frame bracket 18 itself. Again, clamping of the hinge bracket 62 against the vehicle frame bracket 18 is prevented.

In a similar manner to the assembly of upper hinge components 64, lower hinge pin 80 is inserted through lower bushing 82 already positioned in lower opening 48 defined in extension member 44 of vehicle frame bracket 18. The locking surface 156 (e.g., threaded surface 156) is threaded into lower opening 98 defined by threaded locking surface 164. In a manner similar to the upper hinge pin 70, the pin is tightened securely (e.g., with use of grasping surfaces 160) until it seats completely within the substitute hinge bracket 62. Thereafter, lower washer 84 is slid over threaded end portion 152 and the nut 86 (e.g., lock nut) is threaded onto the threaded end portion 152 and tightened.

During any tightening procedures, either one of the upper or lower hinge pins 70, 80 may be grasped and held using the grasping surfaces 140, 160 to hold the pins securely in place while tightening occurs. Further, the grasping surfaces may be used to turn the pins 70, 80 into a seated position. Likewise, appropriate dimensions of the lower pin 80 and/or lower bushing 82 may be selected to reduce adverse effects from inadvertent over-tightening in the same manner as described above with reference to upper hinge pin 70. For example, the dimensions of lower pin 80 may be such that shoulder 157 extends below a lower surface of the lower extension member 44 of the vehicle frame bracket 18, or the length of lower bushing 82 may be sized such that a surface thereof is also provided below the lower surface of the extension member 44 of the vehicle frame bracket 18 after insertion into lower opening 48 thereof. Again, as a result, over-torquing of the nut does not, therefore, cause clamping of the hinge bracket 62 against the vehicle frame bracket 18.

Various materials may be used in addition to those components described herein to enhance functionality of the repaired hinge. For example, Locktite may be applied to the threaded openings 97, 98 of hinge bracket 62, lubricant may be applied on the pins and bushing (e.g., white lithium grease), or any other materials suitable for use with such hinges may be employed.

With the hinge pin and bracket apparatus 60 installed and assembled with vehicle frame bracket 18, pin end portions 130, 150 of respective upper and lower pins 70, 80 are aligned along factory vehicle frame bracket axis 50. Such pins are in substantially the same position as the upper factory pin 24 and lower factory pin 26 prior to their removal. Likewise, preferably, hinge bracket 62 may be repositioned for coupling of factory door bracket 16 as the substitute hinge bracket 62 is substantially the same as (at least in one embodiment) the configuration of the original factory hinge bracket 22, except for the addition of locking surfaces 160, 164 defining openings 97, 98 of the hinge bracket 62.

With the hinge pin and bracket apparatus 60 repositioned, reattachment of the door 14 via the factory door bracket 16 may be accomplished. Again, one or more steps may be used to perform such reattachment of the door 14 as indicated in a factory manual including, for example, coupling of door bracket 16 and hinge bracket 62 via a bolt through bolt slot 91 of hinge bracket 62 and factory adjustment slot 43 of factory door bracket 16. Suitable adjustment may be made to the door 14 after the upper opening 34 of door bracket 16 and the lower opening 36 of door bracket 16 are positioned on the substitute upper and lower hinge pins 70, 80.

One or more of the following various features and benefits may be accomplished using one or more components of the hinge pin and bracket apparatus 60, according to the present invention. For example, the pins are preferably hardened or otherwise treated, to have a hardness that is greater than the hardness (HRB) of the original factory pins. For example, preferably, the hardness is greater than about 80 Rockwell B hardness (HRB). With use of such materials, or treated materials, the potential for breakage of such pins is substantially reduced.

In another embodiment, the pins are manufactured from 1045 high carbon steel (or any steel having a strength or a hardness greater than 1018 steel). This is unlike the factory pins which are manufactured from a lower carbon 1018 steel (e.g., generally a softer material is required so that the ends of the factory pins can be peened). The higher strength material may be necessary to pull the pins into place as the nuts are being tightened, such as, for example, in the hinge pin repair embodiment shown in FIGS. 14–16. Yet further, in one embodiment, stainless steel may be used for providing one or more parts described herein, such as the hinge bracket and/or the pins.

Further, in one or more embodiments, the pins are machined with flat surfaces (e.g., grasp surfaces 140, 160) to allow the installer to tighten the pins with a particular tool (e.g., a 15-millimeter open-ended wrench). Yet further, such pins may be coated to prevent rusting (e.g., yellow dichromate coated).

With use of the locking surfaces of the pins and their corresponding locking surfaces of the hinge bracket 62, the design allows the hinge assembly to be disassembled for future repairs, if necessary.

Figure 11A:
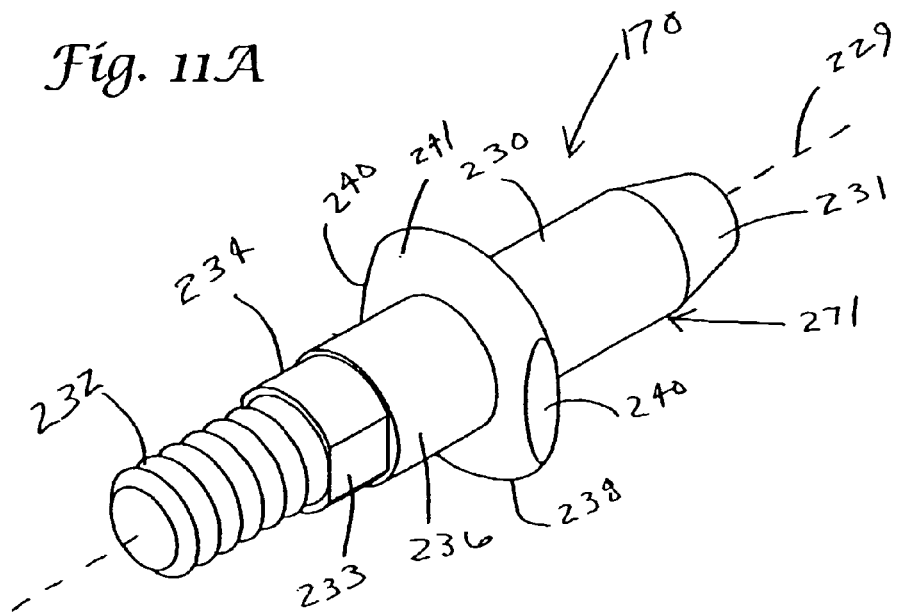
FIGS. 11A–11C show perspective views of an alternate embodiment of an upper pin, a lower pin, and a binge bracket, respectively, that may be used in an alternate configuration of a binge pin and bracket apparatus according to the present invention.
Figure 11B:
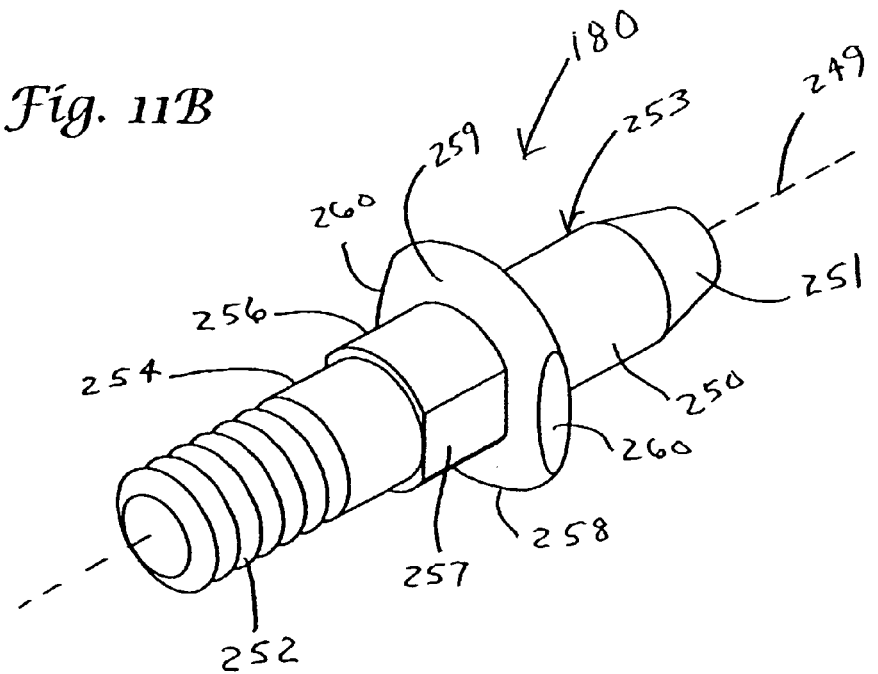
Figure 11C:
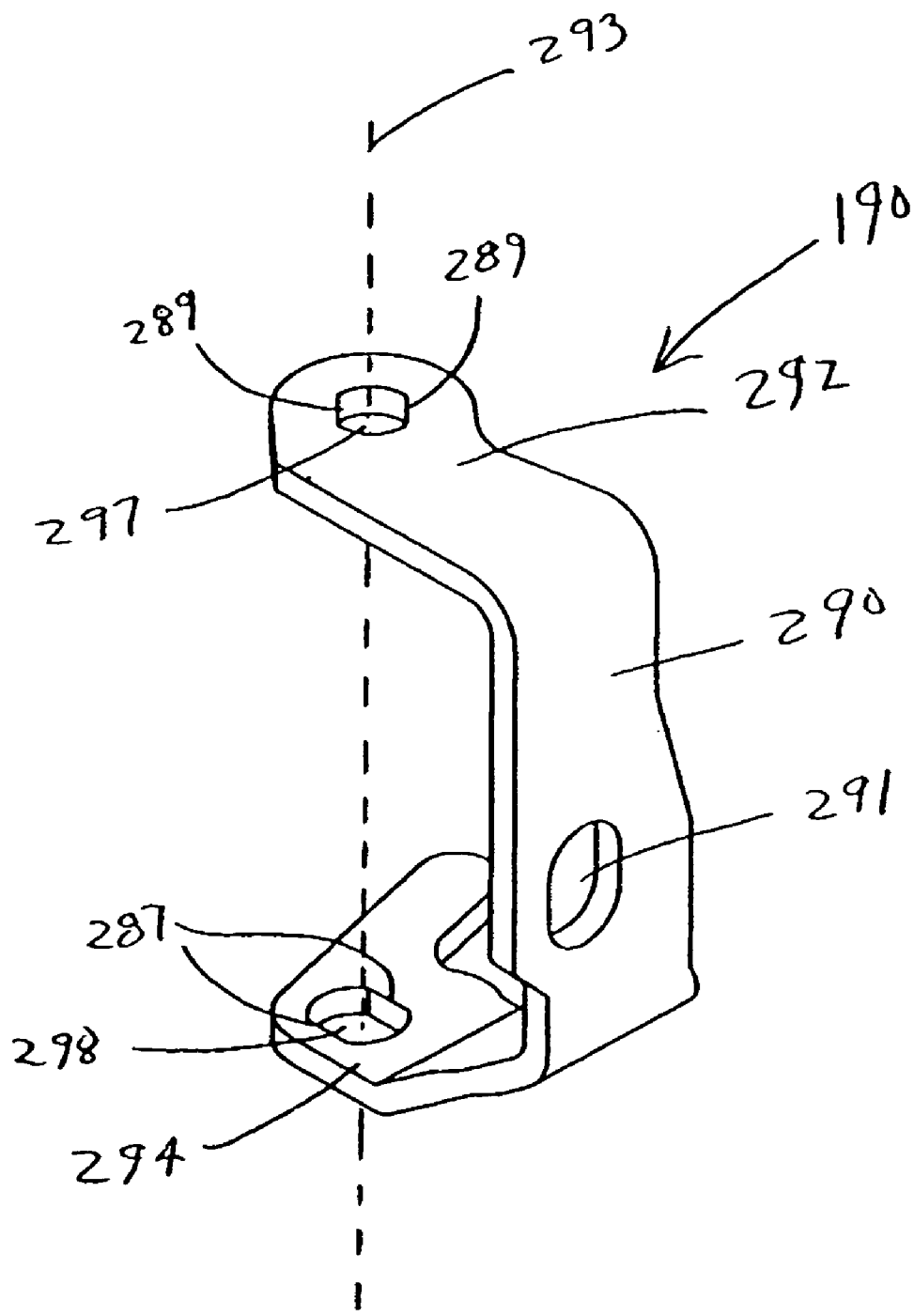

FIGS. 11A–11C show perspective views of an alternate hinge pin and bracket apparatus. FIG. 11A shows a perspective view of an alternate embodiment of an upper hinge pin 170, FIG. 11B shows a perspective view of an alternate embodiment of a lower hinge pin 180, and FIG. 11C shows a perspective view of an alternate embodiment of a hinge bracket 190 to be used with upper and lower hinge pins 170, 180.

The upper hinge pin 170, the lower hinge pin 180, and the corresponding hinge bracket 190 are substantially similar to the same components described with reference to FIGS. 3–10. However, a different type of locking surface is utilized in such components. One skilled in the art will recognize that any number of different types of locking surfaces between the upper and lower hinge pins and the hinge bracket may be used as long as the pins, when seated in the corresponding hinge bracket, do not move therein (e.g., when seated, the pins are not allowed to rotate with respect to the hinge bracket to which they are coupled and locked).

As shown in FIG. 11A, the upper hinge pin 170 includes an elongated body portion 271 extending from a threaded end portion 232 to a pin end portion 230 along axis 229. A locking surface 234 lies along the axis 229 between the threaded end portion 232 and the pin end portion 230. The locking surface 234 comprises flat surfaces 233 that correspond to similar flat surfaces 289 of opening 289 defined in bracket 190 and provide for a locking functionality between the upper pin 170 and the upper opening 289 of hinge bracket 190.

Also lying along axis 229 between threaded end portion 232 and pin end portion 230 is smooth surface 236 that generally corresponds to an opening of a bushing through which the upper hinge pin 170 is to be inserted when assembled. As shown in FIG. 11A, the smooth surface 236 lies between the locking surface 234 and pin end portion 230.

The upper hinge pin 170 further includes an engagement element 238 lying along axis 229 and which extends further from axis 229 than other portions of the elongated pin body portion 271. As such, a lower surface 241 is provided for contact with other components so as to maintain pin end portion 230 available to receive a factory door bracket, such as factory door bracket 16 shown and described with reference to FIGS. 1A–1B. The pin end portion 230 further includes a tapered end 231 for ease in receiving the factory door bracket 16 as the opening 34 of the factory door bracket 16 is placed over the tapered end 231. The engagement element 238 further includes one or more grasp surfaces 240 in a manner similar to those already described herein.

As shown in FIG. 11B, the lower hinge pin 180 includes an elongated body portion 253 extending from a threaded end portion 252 to a pin end portion 250 along axis 249. A locking surface 256 lies along the axis 249 between the threaded end portion 252 and the pin end portion 250. The locking surface 256 comprises flat surfaces 257 that correspond to similar flat surfaces 287 of opening 298 defined in bracket 190 and provide for a locking functionality between the lower pin 180 and the upper opening 298 of hinge bracket 190.

Also lying along axis 249 between threaded end portion 252 and pin end portion 250 is smooth surface 254 that generally corresponds to an opening of a bushing through which the lower hinge pin 180 is to be inserted when assembled. As shown in FIG. 11A, the smooth surface 254 lies between the locking surface 256 and threaded end portion 252.

The lower hinge pin 180 further includes an engagement element 258 lying along axis 249 and which extends further from axis 249 than other portions of the elongated pin body portion 253. As such, a lower surface 259 is provided for contact with other components so as to maintain pin end portion 250 available to receive a factory door bracket, such as factory door bracket 16 shown and described with reference to FIGS. 1A–1B. The pin end portion 250 further includes a tapered end 251 for ease in receiving the factory door bracket 16 as the opening 36 of the factory door bracket 16 is placed over the tapered end 251. The engagement element 258 further includes one or more grasp surfaces 260 in a manner similar to those already described herein.

The hinge bracket 190 is, at least in one embodiment, of the same shape and size as factory hinge bracket 22 for which it is to replace. However, instead of having openings like those of the factory hinge bracket 22 through which factory pins are inserted, the hinge bracket 62 to be substituted for the factory hinge bracket 22 includes openings 297, 298 defined therein by locking surfaces 289, 287, respectively, which correspond to locking surfaces 233, 257 of upper hinge pin 170 and lower hinge pin 180, respectively.

As shown in FIG. 11C, the hinge bracket 190 includes a bracket body 290 with two spaced apart extension members 292, 294 extending therefrom. At least in one embodiment, such extension members 292, 294 each have at least a portion which are substantially parallel to one another. An opening 297 is defined in the upper extension member 292 and an opening 298 is defined in the lower extension member 294. Such openings 297, 298 lie substantially orthogonal to hinge bracket axis 293. Generally, the distance between upper extension member 292 and lower extension member 294 is such that the hinge bracket 190 may be inserted between extension members 42, 44 of vehicle frame bracket 18, such as described with reference to FIGS. 1–2. As shown in FIG. 11C, the locking surfaces 289, 287 (e.g., flat surfaces) correspond to the locking surface regions 233, 257 of upper hinge pin 170 and lower hinge pin 180, respectively.

The substitute hinge bracket 190 (e.g., substitute for a factory hinge bracket) also includes bolt opening 291 in substantially the same location as the factory hinge bracket (e.g., hinge bracket 22) which it is to replace. As such, hinge bracket 190, at least in one embodiment, includes substantially all the features present in the factory hinge which it is to replace.

As the method of repair using the alternate hinge pin and bracket apparatus (i.e., including upper hinge pin 170, lower hinge pin 180, and hinge bracket 190) would be readily apparent from the description provided herein with respect to the repair of hinge 10 using hinge pin and bracket apparatus 60, for simplicity purposes, such a repair method shall not be provided in any further detail.

Figure 14:
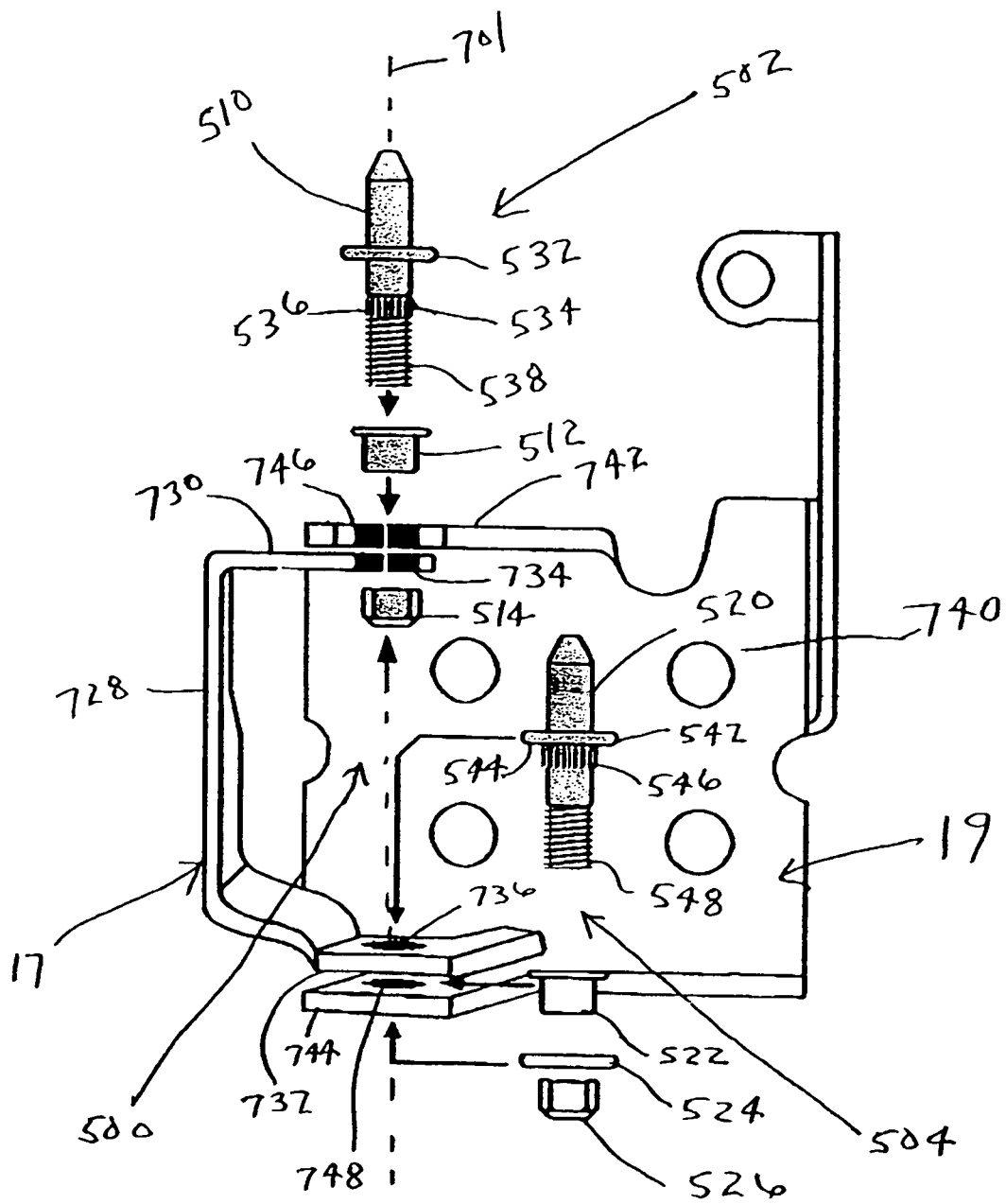
FIG. 14 shows an exploded view of a hinge pin apparatus for a door hinge repair of a passenger side of a vehicle according to the present invention in relation to a factory vehicle frame bracket and a factory hinge bracket for the passenger's side of the vehicle.

One or more components as described herein may be provided as a repair kit for the repair of a factory hinge such as shown and described with reference to FIGS. 14–16. For example, the hinge pin apparatus 500, as shown in FIG. 14, includes components (e.g., upper hinge pin components 502 and lower hinge pin components 504) for repair of a passenger's side door hinge which includes factory vehicle frame bracket 19 (see also FIG. 5) and factory vehicle hinge bracket 17. One skilled in the art will recognize that one or more of such kit elements may be optional. For example, washers (e.g., lock washers) shown as part of lower hinge pin components 504 may optionally be used according to the present invention. Further, a kit may be provided with any combination of the repair components described herein.

The hinge pin apparatus 500 is used to repair hinges without use of a substitute hinge bracket as described with reference to FIGS. 4–11. Rather, different types of pins 510 and 520 are used with the factory hinge bracket 17 to make the repair as will be apparent from the description herein.

Upper hinge pin components 502, at least in one embodiment, include upper pin 510, upper bushing 512, and upper lock nut 514. Likewise, lower hinge pin components 504 include lower pin 520, lower bushing 522, lower washer 524, and lower lock nut 526. Such components 502, 504 are shown unassembled in the exploded view of FIG. 14 along with factory vehicle passenger side frame bracket 19 and factory vehicle passenger side hinge bracket 17. Such components when assembled are much like the configurations shown in FIGS. 4 and 7 but with the alternate components (e.g., the factory hinge bracket and the pins 510, 520).

The factory frame bracket 19 is generally attached to the vehicle frame (e.g., welded) like that of bracket 18 as described herein and the factory hinge bracket 17 is coupled to the factory vehicle frame bracket 19 using an upper factory pin and a lower factory pin (not shown).

The factory vehicle frame bracket 19, as shown in FIG. 14, generally includes a body portion 740 for attachment to the vehicle frame along with spaced apart extension members 742, 744 extending from the body portion 740. An upper opening 746 is defined in the upper extension member 742 and a lower opening 748 is generally defined in lower extension member 744. The upper opening 746 and lower opening 748 are typically orthogonal to a factory frame bracket axis 701 along which such openings 746, 748 lie.

The factory hinge bracket 17 includes a body portion 728 having two spaced apart extension members 730, 732 extending therefrom. The extension members 730, 732 are generally configured such that the factory hinge bracket 17 fits within a space defined by the extension members 742, 744 of factory vehicle frame bracket 19. The factory hinge bracket 17 further includes an opening 734 defined in extension member 730 and an opening 736 defined in extension member 732. When the factory hinge bracket 17 and the vehicle frame bracket 19 are assembled, the openings 734, 736 defined in each of extensions members 730, 732 and the openings 746, 748 defined in extension members 742, 744 of the vehicle frame bracket 19 are generally aligned along axis 701 of the vehicle frame bracket 19 and lie orthogonal thereto.

FIGS. 15A–15B show a side view and a top view of one embodiment of an upper hinge pin 510 shown generally in FIG. 14 according to the present invention. The upper hinge pin 510 includes an elongated body portion 539 extending from a threaded end portion 538 to a pin end portion 533 along axis 531.

An interference portion 536 lies along the axis 531 between the threaded end portion 538 and the pin end portion 533. The interference portion 536, as shall be described further herein, is shown as a knurl in FIGS. 15A–15B. However, according to the present invention, any interference portion that provides for an interference fit with one or more surfaces that define the upper opening 730 of the hinge bracket 17 may be used. For example, the knurl shown in FIGS. 15A–15B includes ridges (e.g., peaks and valleys that lie in the direction of axis 531 and at a radial distance therefrom) that provide for contact pressure between the knurl and the surface(s) defining the opening 730. As used herein, an interference fit refers to any fit where contact pressure is present between surfaces, or portions of surfaces, of two parts (e.g., between the knurl 536 and the surface defining the opening 730).

Also lying along axis 531 between threaded end portion 538 and pin end portion 533 is smooth surface 537. As will be recognized upon reading of the description relating to the repair of the hinge, smooth surface 537 generally corresponds to an opening of bushing 512 through which the upper hinge pin 510 is inserted (e.g., the smooth surface 537 is generally adjacent an inner surface of bushing 512 when assembled).

As shown in FIG. 15A, the smooth surface 537 lies between the interference portion 536 and pin end portion 533. At the interface between smooth surface 537 and interference portion 536 is a shoulder 534. Although shown as a very small shoulder at the interface, one will recognize that by changing the diameter of the smooth surface 537 or the interference portion 536, that such shoulder 534 may be enlarged and provide even a greater contact area for use in coupling with other components of the hinge. For example, this shoulder 534 may contact extension member 730 of hinge bracket 17 when the hinge is assembled. The interference portion 536 extends to the shoulder 534 such that substantially (i.e., in this instance substantially refers to nearly 100%) the entire inner surface defining the opening 734 of the hinge bracket 17 is in contact with the interference portion 536 when the interference portion 536 of the pin 510 is positioned in the opening 734 of the hinge bracket 17 upon assembly. In other words, in one embodiment, the knurl fills the entire opening 734.

The upper hinge pin 510 further includes an engagement element 532 lying along axis 531 and which extends further radially from axis 531 than other portions of the elongated pin body portion 539. As such, a lower surface 581 is provided for contact with other components so as to maintain pin end portion 533 available to receive a factory door bracket, such as a factory door bracket like that of door bracket 16 shown and described with reference to FIGS. 1A–1B. The pin end portion 533 further includes a tapered end 551 for ease in receiving the factory door bracket as the opening of a factory door bracket is placed over the tapered end 551.

The engagement element 532 further includes one or more grasp surfaces 558. The one or more grasp surfaces 558 are configured in a corresponding manner to one or more tools capable of grasping and holding (and/or turning) the upper pin 510 as the hinge pin apparatus 500 is being assembled in relation to factory hinge bracket 17 and/or vehicle frame bracket 19, as shall be further described herein. One skilled in the art will recognize that such grasping surfaces 558 may be flat surfaces that can be grasped (i.e., to hold the pin 510) by a wrench, a socket, or any other tool capable of grasping and holding (and/or turning) the upper hinge pin 510 during assembly. For example, the grasp surfaces may include six flat surfaces in the form of substantially a hexagon such that a socket wrench may be used to hold the upper hinge pin 510.

FIGS. 16A–16B show a side view and a top view of one embodiment of a lower hinge pin 520 shown generally in FIG. 14 according to the present invention. The lower binge pin 520 includes an elongated body portion 549 extending from a threaded end portion 548 to a pin end portion 543 along axis 541.

An interference portion 546 lies along the axis 541 between the threaded end portion 548 and the pin end portion 543. The interference portion 546, as shall be described further herein, is shown as a knurl in FIGS. 16A–16B. However, as described above with respect to the upper hinge pin 510, any interference portion that provides for an interference fit with one or more surfaces defining the opening 736 in extension member 732 of hinge bracket 17 may be used.

Also lying along axis 541 between threaded end portion 548 and pin end portion 543 is smooth surface 547. As will be recognized upon reading of the description relating to the hinge repair, smooth surface 547 generally corresponds to an opening of bushing 522 through which the lower hinge pin 520 is inserted (e.g., the smooth surface 547 is generally adjacent an inner surface of bushing 522 when assembled). As shown in FIG. 16A, the smooth surface 547 lies between the threaded end portion 548 and interference portion 546.

The lower hinge pin 520 further includes an engagement element 542 lying along axis 541 and which extends further from axis 541 than other portions of the elongated pin body portion 549. As such, a lower surface 544 is provided for contact with other components so as to maintain pin end portion 543 available to receive a factory door bracket, similar to the factory door bracket 16 shown and described with reference to FIGS. 1A–1B. The pin end portion 543 further includes a tapered end 561 for ease in receiving the factory door bracket as an opening of the factory door bracket is placed over the tapered end 561.

The lower surface 544 of the engagement element 542 will contact an upper surface of extension member 732 of hinge bracket 17 when the hinge is assembled. The interference portion 546 extends to the lower surface 544 such that substantially (i.e., in this instance substantially refers to nearly 100%) the entire inner surface defining the opening 736 of the hinge bracket 17 is in contact with the interference portion 546 when the interference portion 546 of the pin 520 is positioned in the opening 736 of the hinge bracket 17 upon assembly. In other words, in one embodiment, the knurl fills the entire opening 736.

The engagement element 542 further includes one or more grasp surfaces 568. The one or more grasp surfaces 568 are configured in a corresponding manner to one or more tools capable of grasping and holding (and/or turning) the lower pin 520 as the hinge is being repaired. One skilled in the art will recognize that such grasping surfaces 568 may be the same or different than those described with reference to upper hinge pin 510.

With provision of hinge pin apparatus 500, a method of repairing a factory hinge shall be described with reference to FIGS. 14–16. To begin the repair process, the passenger's side door is removed from the vehicle. Generally, removal of door is described in a factory provided manual and may include one or more various steps. Removal of passenger's side door would include at least removal of a factory bolt that couples the factory hinge bracket 17 to a factory door bracket attached to the door. Likewise, the door must then be lifted off of an upper factory pin and lower factory pin. The peened ends of upper factory pin and lower factory pin, respectively, must then be removed. For example, any sort of removal method may be used, such as, for example, grinding off of the peened ends.

Thereafter, the upper factory pin and the lower factory pin are removed. For example, such factory pins may be removed using a hole punch. However, preferably, any method suitable to remove the upper and lower factory pins without bending the vehicle frame bracket 19 and factory hinge bracket 17 can be utilized. In one embodiment, the punch-out block tool 302, as shown in FIGS. 12–13, may be used to remove the upper and lower factory pins.

After removal of the upper factory pin and lower factory pin, old worn out bushings can also be removed. However, in this embodiment, since the repair of the factory hinge uses the factory hinge bracket 17, it is retained for later assembly. However, the upper and lower factory pins, and factory bushings may be discarded, as they are no longer needed.

With the vehicle frame bracket 19 being separated from the factory hinge bracket 17 (e.g., factory pins and bushings removed), the hinge pin apparatus 500 may be assembled with the vehicle frame bracket 19 and factory hinge bracket 17 using upper hinge pin components 502 and lower hinge pin components 504. It will be apparent to one skilled in the art that one or more of the steps described in the repair of the hinge may be performed in a different order and/or may be optional.

First, the upper bushing 512 (e.g., a cylindrical element including a lip on one end and an opening defined therethrough) is positioned into upper opening 746 defined in upper extension member 742 of the vehicle frame bracket 19 (e.g., the lip of the bushing rests on vehicle frame bracket 19 keeping it from falling through the opening). Likewise, lower bushing 522 (e.g., a cylindrical element including a lip on one end and an opening defined therethrough) is positioned into lower opening 748 defined in lower extension member 744 of vehicle frame bracket 19 (e.g., the lip of the bushing rests on vehicle frame bracket 19).

The factory hinge bracket 17 is placed into position between upper and lower extension members 742, 744 of the vehicle frame bracket 19. The factory hinge bracket 17 is positioned so as to provide for alignment of upper and lower openings 746, 748 defined in vehicle frame bracket 19 and upper and lower openings 734, 736 defined in factory hinge bracket 17.

With the openings 746, 748 aligned with openings 734, 736, the upper hinge pin 510 may be slid down through the upper bushing 512 which is already positioned in the upper opening 746 defined in the upper extension member 742 of the vehicle frame bracket 19. Upper lock nut 514 is then threaded on the threaded end portion 538 and tightened (e.g., by hand).

In a similar manner to the assembly of upper hinge components 502, lower hinge pin 520 is inserted through lower bushing 522 already positioned in lower opening 748 defined in extension member 744 of vehicle frame bracket 19. Thereafter, lower washer 524 is slid over threaded end portion 548 and the nut 526 (e.g., nylon lined lock nut) is threaded onto the threaded end portion 548 and tightened.

The nuts 514, 526 are then tightened until the interference portions 536, 546 are seated properly in the openings 734, 736 of factory hinge bracket 17. During any tightening procedures, either one of the upper or lower hinge pins 510, 520 may be grasped and held using the grasping surfaces 558, 568 to hold the pins securely in place while tightening occurs. Further, the grasping surfaces may be used to turn the pins 510, 520 into a seated position.

With the hinge pin apparatus 500 installed and assembled with vehicle frame bracket 19 and factory hinge bracket 17, pin end portions 533, 543 of respective upper and lower pins 510, 520 are aligned along the factory vehicle frame bracket axis 701. Such pins are in substantially the same position as the upper factory pin and lower factory pin prior to their removal. Likewise, preferably, factory hinge bracket 17 may be repositioned for coupling of a factory door bracket thereto. Thereafter, reattachment of the passenger side door via the factory door bracket may be accomplished.

All references cited herein are incorporated in their entirety as if each were incorporated separately. This invention has been described with reference to illustrative embodiments and is not meant to be construed in a limiting sense. Various modifications of the illustrative embodiments, as well as additional embodiments of the invention, will be apparent to persons skilled in the art upon reference to this description.

What is claimed is:

1. A method for repairing a door hinge, wherein the door hinge comprises at least a vehicle frame bracket attached to a portion of a vehicle frame and a hinge bracket, wherein the vehicle frame bracket comprises a first and second opening aligned along and lying orthogonal to a frame bracket axis, wherein the hinge bracket comprises a first and second opening aligned along and lying orthogonal to the frame bracket axis, wherein the vehicle frame bracket and the hinge bracket are coupled using a first pin positioned in the first opening of the vehicle frame bracket and the first opening of the hinge bracket and using a second pin positioned in the second opening of the vehicle frame bracket and the second opening of the hinge bracket, wherein the method comprises:

removing the first and second pins to release the hinge bracket from the vehicle frame bracket, wherein removing the first and second pins comprises:
  removing ends of the first and second pins holding the first and second pins in the openings of the hinge bracket and vehicle frame bracket;
  pushing the first and second pins out of the openings of the hinge bracket and vehicle frame bracket using a punch tool, wherein the punch tool comprises:
    a body portion; and
    first and second spaced apart portions extending from the body portion to define a bracket receiving region therebetween configured to receive a portion of the vehicle frame bracket and the hinge bracket when the tool is used to remove one of the first and second pins, wherein one of the first and second spaced apart portions defines a pin receiving region configured to receive one of the first and second pins when the tool is used to remove the pin and the other of the first and second spaced apart portions defines a threaded opening configured to receive a threaded punch screw operable to engage the pin when the tool is being used to remove the pin;

providing a first substitute pin configured to be received through the first opening of the vehicle frame bracket and a second substitute pin configured to be received through the second opening of the vehicle frame bracket;

providing a substitute hinge bracket comprising a first and second opening aligned orthogonal on a substitute hinge bracket axis;

aligning the substitute hinge bracket axis and the vehicle frame bracket axis; and coupling the vehicle frame bracket and the substitute hinge bracket using the first and second substitute pins.

2. The method of claim 1, wherein each of the first and second substitute pins comprises a threaded end portion, and further wherein the method comprises coupling a first nut on the threaded end portion of the first substitute pin after the first substitute pin is inserted through the first opening of the vehicle frame bracket and the first opening of the substitute hinge bracket and coupling a second nut on the threaded end portion of the second substitute pin after the second substitute pin is inserted through the second opening of the vehicle frame bracket and the second opening of the substitute hinge bracket.

3. The method of claim 2, wherein the method further comprises providing a first bushing in the first opening of the vehicle frame bracket and providing a second bushing in the second opening of the vehicle frame bracket, wherein the first bushing defines an opening through which the first substitute pin is inserted and the second bushing defines an opening through which the second substitute pin is inserted.

4. The method of claim 3, wherein coupling the first nut on the threaded end portion of the first substitute pin comprises tightening the first nut against an engagement surface of the first substitute pin or first bushing existing at a distance below and outside of the first opening defined in the vehicle frame bracket so as to prevent over-tightening of the first nut against the vehicle frame bracket or wherein coupling the second nut on the threaded end portion of the second substitute pin comprises tightening the second nut against an engagement surface of the second substitute pin or second bushing existing at a distance below and outside of the second opening defined in the vehicle frame bracket so as to prevent over-tightening of the second nut against the vehicle frame bracket.

5. The method of claim 2, wherein each of the first substitute pin and second substitute pin comprises an elongated pin end portion extending along a pin axis at an end opposite the threaded end portion of the first substitute pin, and further wherein each of the first substitute pin and second substitute pin comprises an engagement element extending orthogonal to the pin axis at a position between the threaded end portion and the pin end portion to maintain the pin end portion at a position to receive a door bracket, wherein the door bracket comprises a first opening to be positioned on the pin end portion of the first substitute pin and a second opening to be positioned on the pin end portion of the second substitute pin after the vehicle frame bracket and the substitute hinge bracket are coupled using the first and second substitute pins.

6. The method of claim 5, wherein the engagement element of each of the first substitute pin and second substitute pin is configured with one or more grasping surfaces, and wherein coupling the vehicle frame bracket and the substitute hinge bracket using the first and second substitute pins comprises holding and/or turning at least one of the first substitute pin and second substitute pin using a tool corresponding to such grasping surfaces.

7. A method for repairing a door hinge, wherein the door hinge comprises at least a vehicle frame bracket attached to a portion of a vehicle frame and a hinge bracket, wherein the vehicle frame bracket comprises a first and second opening aligned along and lying orthogonal to a frame bracket axis, wherein the hinge bracket comprises a first and second opening aligned along and lying orthogonal to the frame bracket axis, wherein the vehicle frame bracket and the hinge bracket are coupled using a first pin positioned in the first opening of the vehicle frame bracket and the first opening of the hinge bracket and using a second pin positioned in the second opening of the vehicle frame bracket and the second opening of the hinge bracket, wherein the method comprises:

removing the first and second pins to release the hinge bracket from the vehicle frame bracket, wherein removing the first and second pins comprises:
removing ends of the first and second pins holding the first and second pins in the openings of the hinge bracket and vehicle frame bracket;
pushing the first and second pins out of the openings of the hinge bracket and vehicle frame bracket using a punch tool, wherein the punch tool comprises:
a body portion; and
first and second spaced apart portions extending from the body portion to define a bracket receiving region therebetween configured to receive a portion of the vehicle frame bracket and the hinge bracket when the tool is used to remove one of the first and second pins, wherein one of the first and second spaced apart portions defines a pin receiving region configured to receive one of the first and second pins when the tool is used to remove the pin and the other of the first and second spaced apart portions defines a threaded opening configured to receive a threaded punch screw operable to engage the pin when the tool is being used to remove the pin;

providing a first substitute pin configured to be received through the first opening of the vehicle frame bracket and a second substitute pin configured to be received through the second opening of the vehicle frame bracket;

aligning the hinge bracket and the vehicle frame bracket; and coupling the vehicle frame bracket and the hinge bracket using the first and second substitute pins.

8. The method of claim 7, wherein at least one of the first and second substitute pins comprises:
an interference portion to form an interference fit with one or more surfaces defining the opening of the hinge bracket in which the at least one substitute pin is to be received;
a threaded end portion configured to be inserted through the opening defined in the vehicle frame bracket and the opening defined in the hinge bracket for coupling to a nut;
an elongated pin end portion extending along a pin axis at an end opposite the threaded end portion of the at least one pin; and
an engagement element extending orthogonal to the pin axis at a position between the threaded end portion and the pin end portion to maintain the pin end portion at a position to receive a door bracket of the vehicle when the nut is coupled to the threaded end portion.

9. The method of claim 8, wherein the engagement element is configured with one or more grasping surfaces such that a tool corresponding to such grasping surfaces can be used to hold and/or turn the engagement element, and further wherein coupling the vehicle frame bracket and the hinge bracket comprises using the tool corresponding to the grasping surfaces to hold and/or turn at least one of the first and second substitute pins.

10. The method of claim 8, wherein the interference portion is configured such that substantially an entire inner surface defining the opening of the hinge bracket is in contact with the interference portion of the substitute pin when at least a part of the interference portion of the substitute pin is positioned in the opening of the hinge bracket.

* * * * *